(12) United States Patent
Yerli

(10) Patent No.: US 11,202,037 B2
(45) Date of Patent: Dec. 14, 2021

(54) VIRTUAL PRESENCE SYSTEM AND METHOD THROUGH MERGED REALITY

(71) Applicant: THE CALANY HOLDING S. À R.L., Luxembourg (LU)

(72) Inventor: Cevat Yerli, Frankfurt am Main (DE)

(73) Assignee: THE CALANY Holding S. À R.L., Luxembourg (LU)

( * ) Notice: Subject to any disclaimer, the term of this patent is extended or adjusted under 35 U.S.C. 154(b) by 0 days.

(21) Appl. No.: 16/903,235

(22) Filed: Jun. 16, 2020

(65) Prior Publication Data
US 2020/0404217 A1    Dec. 24, 2020

Related U.S. Application Data

(60) Provisional application No. 62/863,171, filed on Jun. 18, 2019.

(51) Int. Cl.
| | |
|---|---|
| *H04N 7/15* | (2006.01) |
| *G06T 19/00* | (2011.01) |

(Continued)

(52) U.S. Cl.
CPC .............. *H04N 7/157* (2013.01); *G06F 9/453* (2018.02); *G06F 16/2379* (2019.01);
(Continued)

(58) Field of Classification Search
CPC ............ H04N 7/15; G06T 19/00; H04L 29/06
(Continued)

(56) References Cited

U.S. PATENT DOCUMENTS

| | | |
|---|---|---|
| 5,883,817 A | 3/1999 | Chisholm |
| 5,956,039 A | 9/1999 | Woods et al. |

(Continued)

FOREIGN PATENT DOCUMENTS

| | | |
|---|---|---|
| CN | 100484726 C | 5/2009 |
| CN | 102120325 B | 12/2012 |

(Continued)

OTHER PUBLICATIONS

"Walmart Patent Wants You to Shop at Home Using Virtual Reality," Research Brief, Aug. 17, 2018, <https://www.cbinsights.com/research/walmart-virtual-reality-retail-patent/> [retrieved Jun. 5, 2020], 8 pages.

European Search Repod dated Jan. 17, 2020, in European Application No. 19176436.4, filed May 24, 2019, 33 pages.

Massachusetts Institute of Technology, "Huggable", Jul. 17, 2013, <http://www.youtube.com/watch?v=Z-8_RhkdvoA> [retrieved Sep. 6, 2019], 2 pages.

(Continued)

*Primary Examiner* — Melur Ramakrishnaiah
(74) *Attorney, Agent, or Firm* — Christensen O'Connor Johnson Kindness PLLC

(57) ABSTRACT

A virtual presence merged reality system comprises a server comprising at least one processor and memory including a data store storing a persistent virtual world system comprising one or more virtual replicas of real world elements. The virtual replicas provide self-computing capabilities and autonomous behavior. The persistent virtual world system comprises a virtual replica of a physical location hosting a live event, wherein the persistent virtual world system is configured to communicate through a network with a plurality of connected devices that include sensing mechanisms configured to capture real-world data of the live event that enables updating the persistent virtual world system. The system enables guests to virtually visit, interact and make transactions within the live event through the persistent virtual world system. Computer-implemented methods thereof are also provided.

20 Claims, 7 Drawing Sheets

(51) Int. Cl.

| | | |
|---|---|---|
| *H04L 29/06* | (2006.01) | |
| *G06T 7/70* | (2017.01) | |
| *G06F 9/451* | (2018.01) | |
| *G06F 16/23* | (2019.01) | |
| *G06N 20/00* | (2019.01) | |
| *G06F 16/9535* | (2019.01) | |
| *H04L 29/08* | (2006.01) | |
| *G06T 15/20* | (2011.01) | |
| *G06T 17/00* | (2006.01) | |
| *G06T 17/10* | (2006.01) | |
| *G06Q 20/12* | (2012.01) | |

(52) U.S. Cl.
CPC ......... *G06F 16/9535* (2019.01); *G06N 20/00* (2019.01); *G06T 7/70* (2017.01); *G06T 15/205* (2013.01); *G06T 17/005* (2013.01); *G06T 17/10* (2013.01); *G06T 19/006* (2013.01); *H04L 65/4069* (2013.01); *H04L 65/4076* (2013.01); *H04L 67/10* (2013.01); *G06Q 20/123* (2013.01); *G06T 2219/024* (2013.01)

(58) Field of Classification Search
USPC .......................................... 348/14.01–14.16
See application file for complete search history.

(56) References Cited

U.S. PATENT DOCUMENTS

| | | | |
|---|---|---|---|
| 6,278,479 B1 | 8/2001 | Wilson et al. | |
| 6,556,206 B1* | 4/2003 | Benson ................... | G06T 15/20 345/427 |
| 7,168,051 B2 | 1/2007 | Robinson et al. | |
| 7,529,690 B2 | 5/2009 | Hadi | |
| 8,326,704 B2 | 12/2012 | Glazer et al. | |
| 8,564,621 B2 | 10/2013 | Branson | |
| 9,281,727 B1 | 3/2016 | Coley et al. | |
| 9,511,291 B2 | 12/2016 | Lyons et al. | |
| 9,669,321 B2 | 6/2017 | Reveley | |
| 9,704,298 B2 | 7/2017 | Espeset et al. | |
| 9,721,386 B1 | 8/2017 | Worley, III et al. | |
| 10,565,764 B2 | 2/2020 | Han et al. | |
| 2002/0116235 A1* | 8/2002 | Grimm ................... | G07C 11/00 705/5 |
| 2002/0191017 A1 | 12/2002 | Sinclair et al. | |
| 2003/0030658 A1 | 2/2003 | Gibbs et al. | |
| 2006/0122917 A1 | 6/2006 | Lokuge et al. | |
| 2006/0184886 A1 | 8/2006 | Chung et al. | |
| 2007/0168463 A1* | 7/2007 | Rothschild .............. | H04L 67/06 709/217 |
| 2008/0263460 A1 | 10/2008 | Altberg et al. | |
| 2009/0055019 A1 | 2/2009 | Stiehl et al. | |
| 2009/0244059 A1 | 10/2009 | Kulkarni et al. | |
| 2009/0326713 A1 | 12/2009 | Moriya | |
| 2010/0131865 A1 | 5/2010 | Ackley et al. | |
| 2010/0131947 A1 | 5/2010 | Ackley et al. | |
| 2011/0060425 A1 | 3/2011 | Freed | |
| 2012/0038667 A1 | 2/2012 | Branson et al. | |
| 2012/0105475 A1 | 5/2012 | Tseng | |
| 2012/0133638 A1* | 5/2012 | Davison ................... | G06T 19/00 345/419 |
| 2012/0149349 A1 | 6/2012 | Quade | |
| 2013/0009994 A1 | 1/2013 | Hill | |
| 2013/0044106 A1 | 2/2013 | Shuster et al. | |
| 2013/0117377 A1 | 5/2013 | Miller | |
| 2013/0179576 A1 | 7/2013 | Boldyrev et al. | |
| 2014/0063061 A1 | 3/2014 | Reitan | |
| 2014/0214504 A1 | 7/2014 | Young et al. | |
| 2014/0221090 A1 | 8/2014 | Mutschler et al. | |
| 2014/0282220 A1 | 9/2014 | Wantland et al. | |
| 2015/0188984 A1 | 7/2015 | Mullins | |
| 2016/0300392 A1 | 10/2016 | Jonczyk et al. | |
| 2016/0343168 A1 | 11/2016 | Mullins et al. | |
| 2016/0379415 A1 | 12/2016 | Espeset et al. | |

| | | | |
|---|---|---|---|
| 2017/0092223 A1 | 3/2017 | Fain et al. | |
| 2017/0203438 A1 | 7/2017 | Guerin et al. | |
| 2017/0243403 A1 | 8/2017 | Daniels et al. | |
| 2017/0250930 A1* | 8/2017 | Ben-Itzhak ............ | G06F 3/011 |
| 2017/0286572 A1 | 10/2017 | Hershey et al. | |
| 2017/0287496 A1 | 10/2017 | Heitkamp et al. | |
| 2017/0289202 A1* | 10/2017 | Krasadakis ............ | H04L 65/60 |
| 2017/0358024 A1 | 12/2017 | Mattingly et al. | |
| 2018/0040038 A1 | 2/2018 | Vanslette et al. | |
| 2018/0047093 A1* | 2/2018 | High ................... | G06Q 30/0643 |
| 2018/0060948 A1 | 3/2018 | Mattingly et al. | |
| 2018/0089903 A1* | 3/2018 | Pang ................... | H04N 13/117 |
| 2018/0173309 A1* | 6/2018 | Uchiyama ............. | G06F 3/016 |
| 2018/0210436 A1 | 7/2018 | Burd et al. | |
| 2018/0231973 A1 | 8/2018 | Mattingly et al. | |
| 2018/0281193 A1 | 10/2018 | Favis | |
| 2018/0342106 A1 | 11/2018 | Rosado | |
| 2018/0349108 A1 | 12/2018 | Brebner | |
| 2019/0065028 A1 | 2/2019 | Chashchin-Semenov | |
| 2019/0102494 A1 | 4/2019 | Mars | |
| 2019/0102709 A1 | 4/2019 | Correa | |
| 2019/0221036 A1 | 7/2019 | Griffin et al. | |
| 2019/0361589 A1 | 11/2019 | Yerli | |
| 2019/0361797 A1 | 11/2019 | Yerli | |
| 2020/0175759 A1 | 6/2020 | Russell et al. | |
| 2020/0209949 A1 | 7/2020 | Noris et al. | |
| 2020/0210137 A1 | 7/2020 | Noris et al. | |
| 2020/0211251 A1 | 7/2020 | Noris et al. | |
| 2020/0349735 A1 | 11/2020 | Dine et al. | |

FOREIGN PATENT DOCUMENTS

| | | |
|---|---|---|
| DE | 101 28 015 A1 | 12/2001 |
| DE | 10 2005 011 126 A1 | 9/2006 |
| JP | 2005539296 A | 12/2005 |
| JP | 2015502584 A | 4/2013 |
| JP | 2016110245 A | 9/2016 |
| JP | 2016209969 A | 12/2016 |
| KR | 1020180020725 A | 4/2019 |
| WO | 2002/063454 A1 | 8/2002 |
| WO | 2008/065458 A2 | 6/2008 |
| WO | 2009/029559 A1 | 3/2009 |
| WO | 2013/050473 A1 | 4/2013 |
| WO | 2016/017254 A1 | 2/2016 |
| WO | 2016/077493 A8 | 5/2016 |
| WO | 2017/141391 A1 | 8/2017 |
| WO | 2018/074000 A1 | 4/2018 |
| WO | 2019079826 A1 | 10/2018 |

OTHER PUBLICATIONS

Partial European Search Report dated Sep. 9, 2019, in European Application No. 19176436.4, filed May 24, 2019, 18 pages.
Alsamhi, S.H., et al, "Artificial Intelligence-Based Techniques for Emerging Robotics Communication: A Survey and Future Perspectives", Arxiv.Org, Cornell University Library, 201 Olin Library, Cornell University Ithaca, New York, Apr. 25, 2018, pp. 1-10.
Office Action dated Aug. 26, 2020, issued in U.S. Appl. No. 16/903,235, filed Jun. 16, 2020, 21 pages.
Extended European Search Report dated Sep. 14, 2020, issued in European Application No. 20176245.7, 8 pages.
Microsoft Developer: "Developing Mobile Augmented Reality (AR) Applications with Azure Spatial Anchors—BRK2034", May 14, 2019 (May 14, 2019), pp. 1-8, XP54981052, Retrieved from the Internet: URL:https://www.youtube com/watch?v=CVmfP8 TaqNU [retrieved on Oct. 30, 2020] * Relevant timestamps—1:33 to 13:55; 17:20 to 18:52; 43:49 to 51:15.
Extended European Search Report dated Nov. 16, 2020, issued in European Application No. 20180885.4, 12 pages.
European Search Report dated Nov. 18, 2020, issued in European Application No. 20180856.5, 12 pages.
European Search Report dated Nov. 17, 2020, issued in European Application No. 20180736.9, 13 pages.
European Search Report dated Oct. 27, 2020, issued in European Application No. 20180712.0, 11 pages.
Extended European Search Report dated Nov. 18, 2020, issued in European Application No. 20180739.3, 12 pages.

(56) References Cited

OTHER PUBLICATIONS

Extended European Search Report dated Nov. 18, 2020, issued in European Application No. 20180723.7, 12 pages.
Extended European Search Report dated Nov. 19, 2020, issued in European Application No. 20180869.8, 9 pages.
Office Action dated Jan. 11, 2021, issued in U.S. Appl. No. 16/903,239, filed Jun. 16, 2020, 28 pages.
Kang, X., et al., "Virtual Reality Tools for Internet-Based Robotic Teleoperation", Proceedings of the Eighth IEEE International Symposium on Distributed and Real-Time Applications, 2004, 5 pages.
Asanuma, K., et al., "User Interface for Remote Operation of a Moving Robot via Internet", 9 pages.
Office Action dated Feb. 17, 2021, issued in U.S. Appl. No. 16/904,213, filed Jun. 16, 2020, 18 pages.
Extended European Search Report dated Oct. 17, 2019, issued in European Application No. 19176426.5, filed May 24, 2019, 9 pages.
Korean Office Action dated May 26, 2020, issued in KR Application No. 10-2019-0060412, filed May 23, 2019, 13 pages.
Rajappa et al., "Application and Scope Analysis of Augmented Reality in Marketing using Image Processing Technique" (2016).
Office Action dated Aug. 6, 2020, in U.S. Appl. No. 16/421,155, filed May 23, 2019, 26 pages.
Office Action dated Feb. 12, 2021, in U.S. Appl. No. 16/421,155, filed May 23, 2019, 26 pages.
Office Action dated Nov. 19, 2020, issued in Japanese Application No. 2019096980, 42 pages.
Web+DB Press, vol. 32, May 25, 2006, ISBN 4-7741-2752-3, p. 10-17.
Yoshiyuki Hashimoto, "iOS iBeacon/GeoFence/Navi/CoreMotion/M7" (Japanese version), Mar. 1, 2014, ISBN 978-4-7980-4070-7, pp. 82-94.
Micheal Lanham, "Unity AR" (Japanese version), Sep. 1, 2017, ISBN 978-4-87311-810-9, 26 pages.
Jeffrey Richter, "Windows Runtime" (Japanese version), Jun. 9, 2014, ISBN 978-4-8222-9831-9, pp. 291-300.
Office Action issued in Japanese Application No. 2019096678, 3 pages.
Office Action dated Apr. 26, 2021, issued in U.S. Appl. No. 16/903,227, filed Jun. 16, 2020, 40 pages.
Kias et al., "VR is on the Edge: How to Deliver 360° Videos in Mobile Networks," VR/AR Network '17, ACM, Aug. 2017, pp. 30-35.
Foley et al., "KD-Tree Acceleration Structures for a GPU Raytracer," Graphics Hardware 2005, ACM, Jul. 2005, pp. 15-22.
DiVerdi et al., "Level of Detail Interfaces," Proc. Third IEEE and ACM Int'l Conf. on Mixed and Augmented Reality (ISMAR 2004), 2 pages.

* cited by examiner

VIRTUAL PRESENCE SYSTEM AND METHOD THROUGH MERGED REALITY

CROSS-REFERENCE TO RELATED APPLICATIONS

This application claims the benefit of Provisional Application No. 62/863171, filed Jun. 18, 2019, the entire disclosure of which is hereby incorporated by reference herein for all purposes.

BACKGROUND

Consumers have typically required to make purchases either by going personally to the retail outlets offering the services, or by shopping online through the Internet by accessing the stores' websites. Some drawbacks of personal shopping include the shoppers having to travel long distances in order to reach the desired store, on top of the limited opening hours of such stores, which may add to the complications of the shoppers' personal schedule. Online shopping has solved these issues by enabling to make purchases from the comfort of one's home without dealing with the schedule complexities. Recent developments have also enabled online shopping to provide a certain level of personal shopping assistance through the use of a messaging area to a human or artificial intelligence personal assistant. However, the 2D nature of websites used for online shopping limits the ability of users to inspect products or to have a personal interaction with a shopping assistant in order to ask further questions or negotiate, as it would be possible in a personal shopping experience.

For example, luxury or exclusive products, such as yachts, private jets, art pieces, etc., may require a certain level of privacy during a visit in order to inspect the products and obtain as much information as possible from the seller. Nevertheless, in most of these cases, it is not easy to find a suitable time that meets the schedule for both parties. Furthermore, in many cases, long distances have to be travelled by the shopper to make the personal viewing.

Therefore, developments in the field of personal or public shopping and visitations are required.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure generally relates to computer systems, and more specifically to a system and method enabling virtual presence that may be used for visiting real or virtual places through a merged reality.

In the current disclosure, an accurate and flexible merged reality system and method configured to enable virtual presence that may be used for visiting real or virtual places is provided. The system and method may provide varying mixtures of reality that enable reality to be replaced by a persistent virtual world in virtual reality, or to have only some parts of reality to be replaced or expanded through virtual objects, as in augmented or mixed reality. In the merged reality system, real-world elements are replicated in virtual form to include a plurality of data that represent not just visual aspects of the elements but also physical and behavioral aspects, in addition to data used to synchronize the virtual and real elements. By virtualizing the real world, the system and method of the current disclosure further enable real-time interactions between real and virtual objects. In some embodiments, the merged reality system for enabling a virtual presence further enables machine to machine, human to machine, machine to human, and human to human interactions. Thus, the merged reality system enables potential buyers to virtually visit a store or attend a private viewing or event, to inspect the products or areas of interest, to interact with the seller or assistant, and to make automated transactions such as making a purchase during the visit. Because the realities are merged, buyers and sellers can have the option to augment the products and even some parts of the store to accommodate to the situation, such as changing the color, size, model, or technical specifications of the product of interest. Other virtual elements, such as purely virtual objects or graphical representations of applications and games, can also be configured in the store to further augment the shopping experience.

In some embodiments, a virtual presence merged reality system is provided, the system comprising at least one server (e.g., of a cloud server computer system) configured to store and process input data, the at least one server comprising at least one processor and memory including a data store storing a persistent virtual world system comprising one or more virtual replicas of real world elements, the virtual replicas comprising, e.g., logic, virtual data and models. In some embodiments, virtual data and models provide the virtual replicas with self-computing capabilities and autonomous behavior. The persistent virtual world system comprises a virtual replica of a physical location hosting a live event, and may further include a context associated with the live event. The persistent virtual world system is configured to communicate through a network with a plurality of connected devices that include sensing mechanisms configured to capture real-world data of the live event. The persistent virtual world system is configured to enable one or more guests (e.g., potential buyers) to visit the live event through the persistent virtual world system via a user device and interact with elements from the live event. The persistent virtual world system is further configured to enable interactions between elements within the physical location hosting the event.

In some embodiments, the virtual replicas include logic, virtual data and models that may be input through a plurality of software platforms, software engines, and/or sensors connected to connected devices. In the current disclosure, logic refers to rules that define the operational instructions and behavior embedded in computer code, which may be required for the programming of virtual replicas or applications available in the persistent virtual world system. Virtual data are the attributes of the virtual replicas, and the models are the graphical, mathematical and/or logic representations of any aspect of the corresponding real-world element, which may be defined and governed through the comprised logic.

In some embodiments, suitable models comprise one or more of a 3D model, dynamic model, geometric model, or a machine learning model, or a combination thereof. The models and data may be input via a plurality of external platforms or engine services included in the persistent virtual world system. The plurality of external platforms may include, for example, an Internet of Things (IoT) platform, a machine learning (ML) platform, a big data platform or a simulation platform. External platforms may connect to the persistent virtual world system through application programming interfaces (APIs) and software development kits (SDKs), in order to provide and manipulate models and data of the virtual replicas. The engine services included in the persistent virtual world system may include artificial intelligence, simulation, 3D and haptic features, amongst others. The persistent virtual world system also connects to a spatial data streaming platform configured to receive and manage spatial data from the real-world elements and also from their virtual replicas. The system may further comprise digital reality interfaces, such as virtual reality, augmented reality, and merged reality interfaces to interact with the merged reality or virtual reality. These interaction interfaces and mechanics are defined through the use of computer code included in computer scripts and programs, and may be affected by applications (e.g., distributed applications) smart contracts, and the like, available in the persistent virtual world system where the interactions take place, digitally codifying possible and desired interactions between all or most elements of the real world in a predetermined area and the virtual world, resulting in one view of the merged interactive reality.

The geometric model comprises the mathematical model defining the shape of the virtual replica based on the real-world element. The 3D model goes in hand with the geometric model to show data included in each of the geometries of the virtual replica, such as textures, colors, shading, reflection, lighting, collision effects. The 3D models comprise the 3D data structure that is used to visually represent the virtual replicas and other virtual elements in the persistent virtual world system, such as applications, ads, virtual bots, etc. The 3D data structure may include, for example, one or more octrees, such as sparse voxel octrees or dense voxel trees, which may be suitable for virtualizing the world into the persistent virtual world system through 3D scanning techniques. However, other data structures may further be included, such as quadtrees, BSP trees, 3D arrays, kD trees, point clouds, wire-frames, boundary representations (B-Rep), constructive solid geometry trees (CSG Trees), bintrees, and hexagonal structures. The 3D data structure serves the function of accurately and efficiently representing the data of each of the geometries of the virtual objects in the persistent virtual world system.

The dynamic model represents the mathematical model describing the behavior of the real-world objects in the virtual world over time, may comprise a set of states that occur in a defined sequence, and may comprise continuous (e.g., algebraic or differential equations) and discrete (e.g., as state-machine or stochastic models) dynamics models.

The machine learning model is a mathematical representation of the real-world objects and processes, normally generated by a machine learning algorithm based on actual or simulated data that have been used as training data to learn from. This model may enable implementation of artificial intelligence techniques that can be used to optimize the operation and/or performance of the real-world element through the virtual replica. The machine learning model may employ machine learning algorithms that allow teaching a virtual replica about the behavior of a real-world element in order to simulate the behavior of the real-world element.

In some embodiments, the models used in the virtual replicas consider the level of detail (LOD) required by a specific scenario computation. LOD involves decreasing the complexity of a model representation as the virtual replica moves away from the viewer, or according to other metrics such as object importance, viewpoint-relative speed, or position. In some embodiments, LOD is further adjusted to individual viewers depending on a classification of the individual viewers comprising artificial intelligence viewers (e.g., an AI shopping assistant) or a human viewers (e.g., a human shopper). In some embodiments, the LOD is further adjusted depending on a sub-classification of artificial intelligence viewer or of human viewer. LOD is a feature typically used in game engines to optimize real-time rendering, using more detailed models only where the point of view of the user is closer to the object. LOD management increases the efficiency of computing processes, such as the rendering process by decreasing the workload on graphics pipeline usage, typically vertex transformations, or by enhancing physical simulations, as different physical models can be associated to the virtual replicas, from low to high fidelity models, enabling different simulations to be performed depending on the case and situation.

In embodiments of the current disclosure, the system may use a cloud to edge infrastructure that may implement distributed computing capabilities, comprising employing public or private clouds, distributed ledger-based infrastructure, cloudlets and edge systems, such as enterprise systems, mobile platforms, and user devices. The distributed ledger-based infrastructure may be a decentralized and immutable blockchain or distributed ledger network that facilitates the transfer and storage of data necessary to widely distribute the persistent virtual world system, including virtual replicas, applications, and any event or interaction within the persistent virtual world system. Through the cloud to edge infrastructure, resources including physical servers and network equipment enable a shared storage and computing that may allow for a dynamic allocation thereof depending on factors such as the distance of the user to the resources and the network and computational demand from the users relative to each other and to the locational positions they are, commanding more or less compute accordingly. In some embodiments, the dynamic allocation of storage and computing is codified into smart contracts using the distributed ledger infrastructure, automatizing the transactional logic (e.g., the computer logic behind each allocation of storage and computing) and the consequences or results of such allocation.

In some embodiments, the persistent virtual world system further comprises applications that users may interact with through user devices. The applications can be, for example, distributed applications using a distributed cloud to edge infrastructure of the current disclosure. The applications can assist in defining the type of interaction that users can have with the elements of the persistent virtual world system, such as enabling an interactive game-like mechanics with virtual replicas or avatars of other users in the persistent virtual world system. The applications can be available at an application library stored in the memory of the server or from external sources, such as through external application libraries connected to the server and providing applications to the persistent virtual world system.

In some embodiments, in order to reduce hardware and network demands, contribute to the reduction of network latency, and improve the general merged reality experience, the system may connect through a network including millimeter-wave (mmW) or combinations of mmW and sub 6 GHz communication systems, such as through $5^{th}$ generation wireless systems communication (5G). In other embodiments, the system may connect through wireless local area networking (Wi-Fi). Provided communication systems may allow for low latency end-to-end (E2E) latency and high downlink speeds to end points in the field, complying with parameters necessary for executing the typically highly-interactive digital reality applications or other highly-demanding applications. This results in high-quality, low latency, real-time digital application content streaming. In other embodiments, the system may communicatively connect through 4th generation wireless systems communication (4G), may be supported by 4G communication systems, or may include other wired or wireless communication systems.

In some embodiments, the plurality of connected devices in the live event physical location comprise one or more RGBD cameras, depth cameras, LIDAR cameras, CCTV cameras, or IoT devices, or combinations thereof. In a yet further embodiment, the connected devices are configured to record events in the physical location, scan and generate 3D images of the physical location, detect state changes in one or more objects within the physical location, or combinations thereof. In yet further embodiments, cameras employed within the live event physical location use artificial intelligence-based machine vision to identify objects or people and their positions and orientations within the live event physical location.

By providing a plurality of connected devices with sensing mechanisms constantly capturing data from the real world, the virtual world and each of the synchronized virtual replicas are kept updated with real-time, multi-source data that mirror the conditions of the real world. In some embodiments, the multi-source data is processed through artificial intelligence algorithms that further provide the virtual replicas with autonomous behavior that can augment the real world. The artificial intelligence processing of the data may comprise performing data, image and object recognitions; data and object classification; data, image or object segmentations; data, image or object masking; data, image or object categorization; multi-dimensional trajectory generation of data and objects; or combinations thereof. The multi-source data includes capturable data of each real-world element, comprising one or more of 3D image data, 3D geometries, 3D entities, 3D sensory data, 3D dynamic objects, video data, audio data, priority data, chemical composition, waste production data, textual data, time data, positional data, orientational data, velocity data, temperature data, humidity data, pollution data, lighting data, volume data, flow data, chromatic data, power consumption data, bandwidth data, and mass data, amongst others.

According to an embodiment, the sensing mechanisms mounted on the connected devices include a combination of inertial tracking sensing mechanisms and transceivers, wherein data tracked by such combination is available as embedded tracking data or tracking metadata to the sensed datasets. The inertial tracking sensing mechanisms can make use of devices such as accelerometers, gyroscopes, magnetometers, and others, which may be integrated in an inertial measuring unit (IMU), or may be separate from an IMU. In an embodiment, the transceivers are mmW transceivers. In embodiments where mmW antennas are employed, the mmW transceivers are configured to receive mmW signals from the antennas and to send the data back to the antennas. The inertial sensors, and positional tracking provided by mmW transceivers and the accurate tracking, low-latency and high QOS functionalities provided by mmW-based antennas may enable sub-centimeter or sub-millimeter positional and orientational tracking, which may increase accuracy when tracking the real-time position and orientation of the connected elements. In some embodiments, tracking may be implemented by employing several techniques known in the art, such as time of arrival (TOA), angle of arrival (AOA), or other tracking techniques known in the art (e.g., visual imaging, radar technology, etc.). In alternative embodiments, the sensing mechanisms and transceivers may be coupled together in a single tracking module device.

In some embodiments, the at least one server may store a virtual world layer that may be separated into an augmented reality layer and virtual reality layer. The separate layers may enable accessing, through the merged reality, the persistent virtual world system in any of augmented or virtual reality, and may be activated through user devices connected the at least one server whenever accessing one or the other type of reality. Each of the layers may comprise augmentations of reality and virtual replicas that may be specific to each layer. The layers may further comprise one or more applications, which may be available from one or more application libraries stored in the memory of the at least one cloud server, from external platforms, or through blockchains or distributed ledger-based distributed databases. The applications can be one or more traditional applications, distributed applications or decentralized applications.

In some embodiments, the live event physical location has an associated digital identifier stored in the at least one cloud server, the digital identifier being retrieved by the user device from the guest in order to access the associated live event physical location through the persistent virtual world system. In some embodiments, the digital identifier comprises one or more of a QR code, URL, IP address, MAC address, cryptographic hash, universally unique identifier, and organizationally unique identifier. In yet further embodiments, the guest accesses the event through the persistent virtual world system upon receiving an invitation from a host device to access the live event. In yet further embodiments, the digital identifier is retrieved by the user device from the guest upon receiving the invitation. In other embodiments, the digital identifier is openly shared as part of contact details of the live event physical location or of the host.

In some embodiments, a guest location from which a guest remotely accesses the physical location hosting the event comprises connected devices, such as cameras recording and detecting movements and expressions from a guest that are simulated on the avatar's guest. In further embodiments, the guest location is one of a virtual reality-dedicated cabin, a phone booth, a meeting room, or any room within or outside of a building. Guest movements and interactions during the remote visit are performed by physically moving within the physical room or by manipulating a controller interface on the user device.

In some embodiments, the system further comprises a personal assistant hosting the event and being dedicated to show the guest visiting the event through persistent virtual world system. In yet further embodiments, the personal assistant is an artificial intelligence agent represented by an avatar viewable in the real location, or a real human being. In further embodiments, the host may join the event physical location remotely as a virtual avatar in order to receive the one or more guests, therefore not needing to be physically at the event physical location, or may join the event by being physically present at the live event physical location.

In some embodiments, each user device has a personal identifier that enables the at least one server to identify a guest in order to provide a personalized experience. In yet further embodiments, each interaction performed by the guest, comprising, for example, transactions and engagement actions, is recorded in the memory of the at least one server under the user device personal identifier. In yet further embodiments, each interaction performed by the guest is recorded in a smart contract of a distributed ledger under the user device personal identifier. In some embodiments, the recorded interaction data may be used in the future for creating targeted ads or personalized experience for users. In some embodiments, the personalized experiences can take the form of a personalized store front or visitation room displaying characteristics matching the guest's preferences, such as having the store front or visiting area augmented with the guest's favorite colors, music, and range of products that can improve the virtual visiting experience. In some embodiments, the personalized experience can comprise modifying a theme of the store front or visitation area, which can comprise implementing a virtual modification of the context of the store front or visitation room automatically based on the available recorded interaction and preference data or as selected by the guest or host.

In some embodiments, the live event taking place in the physical location is one or more of a virtual reality call, personal shopping visit, conference room visit, real estate visit, entertainment event, video-gaming event, and auction.

In some embodiments, transactions are automatically performed at the moment of ending the virtual visit session, or at a later point, through an automatic payment system accessing the user's payment card data associated to the personal identifier linked to the user account with the persistent virtual world system. In another embodiment, the transaction may be enabled through the use of a smart contract recording on a blockchain or distributed ledger the binding purchase agreement and initiating the transaction of related real or digital currencies to be transferred. In another embodiment, the transaction may be enabled by the user virtually crossing a predetermined checkout area in the yacht. The checkout area may, through the tracking of the user device, accurately detect the geolocation and spatial location of the user avatar in order to detect when the checkout has been crossed. Crossing the predetermined checkout area may trigger the cloud server to retrieve user's payment information associated to the user's personal identifier linked to user account in the persistent virtual world system, connecting to the payment institution, automatically paying for the purchased goods, and triggering a delivery system to deliver the goods to the user.

In some embodiments, a method enabling virtual presence through a merged reality system comprises providing in the memory of a server a data store storing a persistent virtual world system comprising one or more virtual replicas of real world elements, the one or more virtual replicas comprising virtual data and models; providing a virtual replica of a physical location hosting a live event and a context associated with the live event; providing in the physical location a plurality of connected devices communicating to the persistent virtual world system through a network and including sensing mechanisms configured to capture real-world data of the live event; detecting a user device of a guest visiting the live through the persistent virtual world system, and enabling interactions with one or more elements within the live event (e.g., in response to detecting the presence of an authorized user device at the physical location) and between the elements of the live event.

In some embodiments, the method further comprises accessing the location of the live event through the persistent virtual world system in augmented or virtual reality, wherein the at least one server stores separate layers for each of the augmented and virtual reality that are activated through the user devices connected to the at least one server, each layer comprising augmentations of reality and virtual replicas specific to each layer.

In some embodiments, the method further comprises providing, by a host device, an invitation to the one or more guests to access the live event.

In some embodiments, the method further comprises providing in the at least one server a digital identifier associated to each physical location hosting a live event. The digital identifier may be retrieved by the user device from the at least one server in order to access the associated physical location through the persistent virtual world system. In further embodiments, the digital identifier comprises one or more of a QR code, URL, IP address, MAC address, cryptographic hash, universally unique identifier, and organizationally unique identifier. In yet further embodiments, the method further comprises sending, by the at least one host device, the digital identifier upon the user device receiving the invitation to access the live event, or openly sharing the digital identifier as part of contact details of the live event physical location or of the host.

In some embodiments, the method further comprises providing a personal assistant dedicated to show the visitor vising the event through persistent virtual world system, wherein the personal assistant is an artificial intelligence agent represented by an avatar, or a real human being.

In some embodiments, the method further comprises storing in the at least one server a user device personal identifier enabling identification of the guest in order to provide a personalized experience to the guest; and recording each transaction performed by the guest under the user device personal identifier.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages of the present disclosure will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
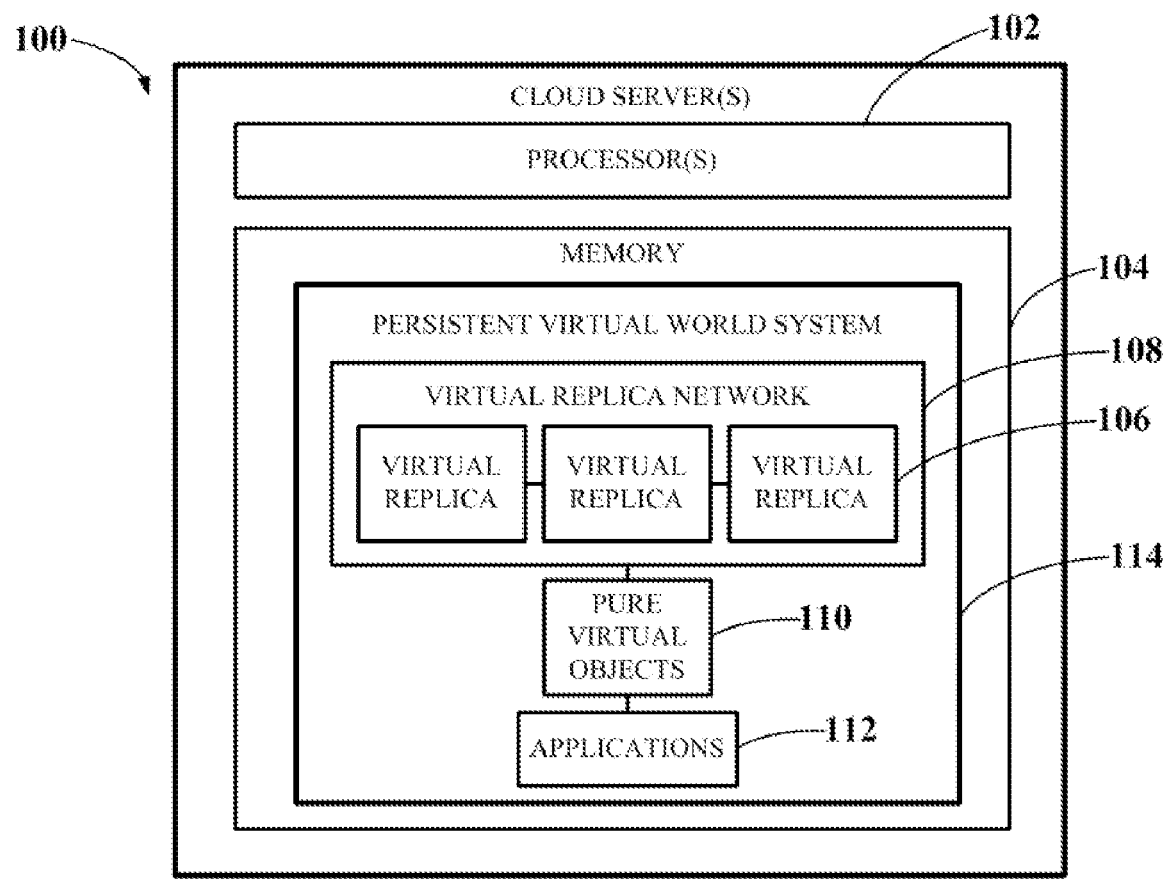
FIG. 1 depicts a diagram of a cloud server of a server computer system that may be used to implement a virtual presence merged reality system, according to an embodiment.

FIG. 1 depicts a diagram describing a cloud server 100 of a server computer system that may be used to implement a virtual presence merged reality system, according to an embodiment.

In the current disclosure, the term virtual presence refers to the act of being present in a virtual manner through a virtual avatar employing the merged reality system of the current disclosure. The virtual avatar represents a user and enables the user to experience an event in a virtual or real location as if he or she were present in said location. Therefore, users may, for example, be virtually "teleported" through the merged reality system and enable them to visit a live or virtual event such as lecture, auction, museum or other type of exhibition, real estate viewing, meeting, conference, or any private or public viewing taking place in a real or virtual location.

The cloud server 100 comprises one or more processors 102 and memory 104 including a data store with virtual replicas 106 of real world elements. A plurality of connected virtual replicas 106 form a virtual replica network 108, which enable the establishment of peer-to-peer (P2P) connections either through direct physical communications or through indirect virtual replica-based connections. The memory 104 may further store pure virtual objects 110 not available in the real world and applications 112 that can be located in various parts of the world. A plurality of virtual replica networks 108 in inter-connected areas of the world along with the pure virtual objects 110 and applications 112 form a persistent virtual world system 114, which may be accessed through suitable interfaces of user devices.

Although some examples are described herein with reference to a single server (e.g., cloud server 100), it should be understood that functions described herein as being performed by a single server may instead be performed by a server system comprising multiple server computers, or vice versa.

In the current disclosure, the term "persistent" is used to characterize a state of a system that can continue to exist without a continuously executing process or network connection. For example, the term "persistent" may be used to characterize the virtual world system where the virtual world system and all of the virtual replicas, purely virtual objects and applications therein comprised continue to exist after the processes used for creating the virtual replicas, purely virtual objects and applications cease, and independent of users being connected to the virtual world system. Thus, the virtual world system is saved in a non-volatile storage location (e.g., in the cloud server 100). In this way, virtual replicas, purely virtual objects and applications may interact and collaborate with each other when being configured for accomplishing specific goals even if users are not connected to the server.

In the current disclosure, the term "virtual replica" refers to accurate and persistent virtual representations of real-world elements. In an embodiment, the virtual replicas 106 of the current disclosure refer to a virtual version, also herein referred to as virtual twin, of a real-world element, also herein referred to as real twin, which may either be mapped or modeled through computer assisted drawing (CAD) or computer-assisted engineering (CAE) methods, input by computer models of the real objects (e.g., building information models—BIMs) or other suitable methods, and which may mirror not just the appearance but also the behavior of the real twin. The real-world objects may additionally include sensors that can provide the virtual replicas 106 with multi-source input data for enriching and synchronizing the virtual replicas 106 with their respective real counterpart. Thus, virtual replicas 106 may obtain data from one or more sources (e.g., from one or more real-world objects, environmental sensors, computing devices, etc.). As used herein, the term "multi-source data" refers to data that may be obtained from multiple sources.

Virtual replicas may be updated based on multi-source data, such as by updating known parameters or features, by enriching the virtual replicas with additional parameters or features, or the like. In the current disclosure, the term "enriching" is used to describe the act of providing further properties to a virtual replica based on multi-source data. Enriching a virtual replica may be considered a special form of updating the virtual replica with one or more new forms of data that may not have been previously present in the virtual replica. For example, enriching the virtual replicas may refer to providing real-world data captured from sensing mechanisms on a plurality of devices, wherein the further real-world data comprises video data, temperature data, real-time energy consumption data, real-time water consumption data, speed or acceleration data, or the like.

The virtual replica networks 108 of the virtual presence merged reality system enable machine to machine, human to machine, machine to human, and human to human communication and interactions. The interaction mechanics are defined through the use of computer code included in computer scripts and computer programs, and may be enabled through applications, smart contracts available in a blockchain or distributed ledger-based distributed database, or combinations thereof provisioned in the persistent virtual world system where the interactions and interaction applications take place. The applications, smart contracts or combinations thereof thus enable digitally codifying and representing the possible and desired interactions and interaction interfaces between all or most elements of the real world in a predetermined area through the persistent virtual world system. Interactions may be experienced by users in the form of interactive game-like applications or through game-like interaction mechanics. The interactions may be enabled, for example, during virtual visitations of physical locations through a virtual replica of the physical location, whereby users visiting such a location may virtually interact with elements therein configured through the enablement of a virtual presence.

Figure 2:
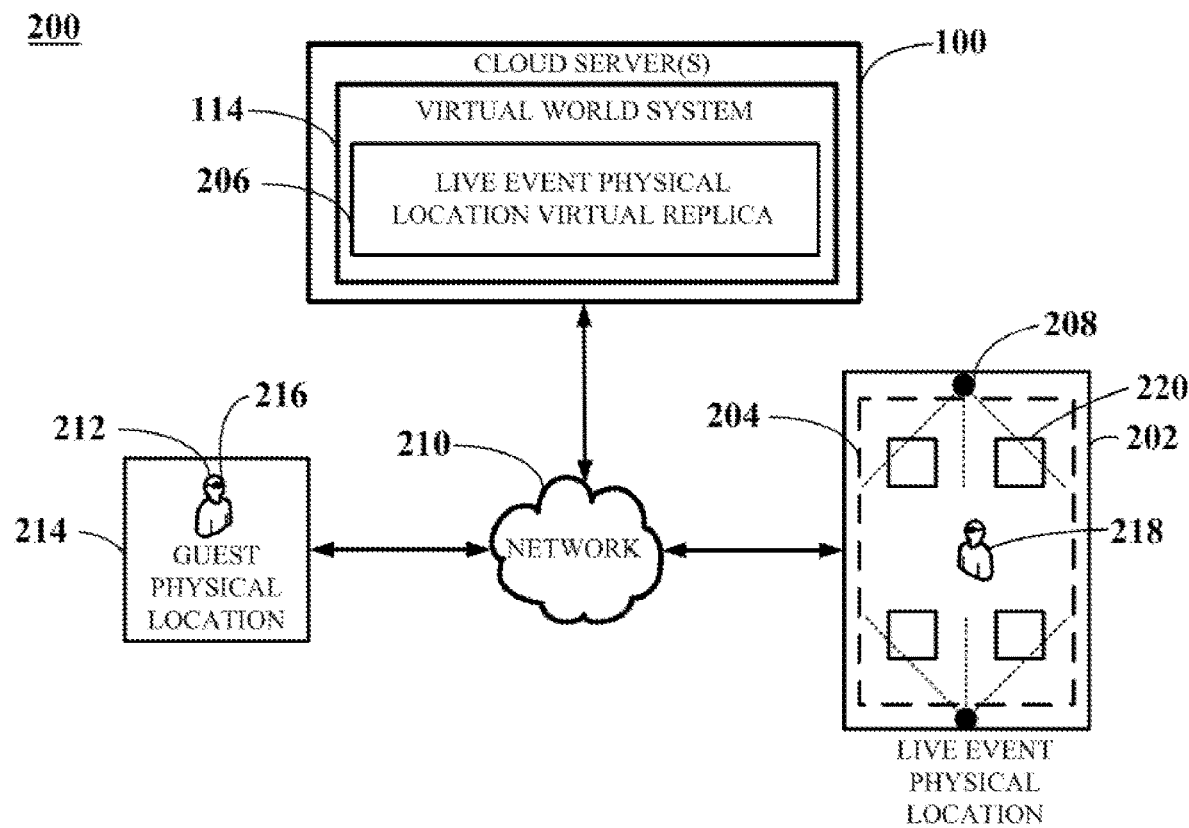
FIG. 2 shows an embodiment of a virtual presence merged reality system.

FIG. 2 shows an embodiment of a virtual presence merged reality system 200. Some elements of FIG. 2 may refer to similar or the same elements of the system depicted in FIG. 1 and thus may use the same reference numbers.

The system 200 of FIG. 2 comprises at least one cloud server 100 configured to store and process input data, the at least one server comprising at least one processor and memory including a data store storing a persistent virtual world system 114 and comprising one or more virtual replicas of real world elements, the virtual replicas comprising virtual data and models. In some embodiments, the virtual data and models provide the virtual replicas with self-computing capabilities and autonomous behavior. The system 200 further comprises a live event physical location 202 comprising a context 204 associated with the live event, wherein a live event physical location virtual replica 206 is comprised in the persistent virtual world system 114 of the at least one cloud server 100. The live event physical location 202 comprises a plurality of connected devices 208 which connect through a network 210 to the persistent virtual world system 114 and which includes sensing mechanisms configured to capture real-world data of the live event. A guest 212 located in a guest physical location 214 may visit the live event in the live event physical location 202 through the persistent virtual world system 114 via a user device 216 and may interact with elements from the live event. The user device 216 may be one of a mobile device, personal computer, game console, media center, smart contact lenses, and head-mounted display, amongst others. The guest 212 may be received by a host 218 viewable at the live event physical location 202. The host 218 receiving the guest 212 may be the creator of the live event, and, in some embodiments, may additionally act as a personal assistant dedicated to provide help to one or more guests 212 during their shopping experience. The guest 212 may virtually interact with the host 218 or with any object 220 comprised within the context 204 of the live event in the live event physical location 202. Furthermore, objects 220 within the live event physical location 202 may also interact with each other via their respective virtual replicas within the live event physical location virtual replica 206.

Interactions in the live event physical location 202 are provisioned through computer code included in computer scripts and computer programs, and are enabled through applications comprising traditional, distributed or decentralized applications; smart contracts; and the like, or combinations thereof. The applications, smart contracts or combinations thereof thus enable digitally codifying a variety of virtual interactions, such as virtual buying, virtual investments, virtual auctions, virtually playing, virtually testing, virtually inspecting, virtually touching, virtually gazing, virtually physically speaking, virtually listening, virtually physically interacting, virtually voting, virtually signing, virtually drawing, virtually composing, virtually creating, virtually collaborating, virtual locomotion, virtually driving, virtually flying, virtually performing surgery, virtually consulting, virtually vacating, virtually constructing, virtually engineering, virtually designing, virtually training, virtually learning, virtually educating, virtually medicating, virtually remote controlling, virtually feeling, virtually emoting, virtually winking, virtually waving, virtually paying, virtually transferring, virtually sharing, and virtually collecting, amongst others. These interactions may be enabled alone or together with other real or virtual guests or a combinations thereof through the live event physical location virtual replica 206, creating a corresponding real world effect and interaction.

In some embodiments, data of objects 220 related to the context 204 of the event and people therein included comprises real spatial data that is directly input, or captured and transmitted to the live event physical location virtual replica 206 and is converted into virtual data comprising virtual spatial data. Combinations of the real and virtual spatial data by the at least one cloud server 100 enable augmenting the real spatial data of the live event physical location 202 with the virtual spatial data. Thus, the position and orientation of the objects 220 and people within the live event are mapped or sensed through the plurality of connected devices 208 and are updated in real-time in the persistent virtual world system 114, enabling the guest 212 to view in real-time any change in the live event physical location 202.

In some embodiments, the plurality of connected devices 208 in the live event physical location 202 comprise one or more RGBD cameras, depth cameras, LIDAR cameras, CCTV cameras, or Internet of Things devices, or combinations thereof. In a yet further embodiment, the connected devices 208 are configured to record events in the physical location, scan and generate 3D images of the physical location, detect state changes in one or more objects 220 within the physical location, or combinations thereof. In yet further embodiments, cameras employed within the live event physical location 202 use artificial intelligence-based machine vision to identify objects 220 or people and their positions and orientations within the live event physical location 202.

In some embodiments, the live event physical location 202 has an associated digital identifier stored in the at least one cloud server 100, the digital identifier being retrieved by the user device 216 from the guest 212 in order to access the associated live event physical location 202 through the persistent virtual world system 114. In some embodiments, the digital identifier comprises one or more of a QR code, URL, IP address, MAC address, cryptographic hash, universally unique identifier, and organizationally unique identifier. In yet further embodiments, the guest 212 accesses the event through the persistent virtual world system 206 upon receiving an invitation from a host device to access the live event. The host device may refer to a user device employed by the originator of the live event or from other artificial or human users entitled to generate invitations to hosted events. In yet further embodiments, the digital identifier is retrieved by the user device 216 from the guest 212 upon receiving the invitation. In other embodiments, the digital identifier is openly shared as part of contact details of the live event physical location 202 or of the host 218.

In some embodiments, the guest physical location 214 comprises connected devices, such as cameras recording and detecting movements and expressions from a guest that are simulated on the avatar's guest. The guest physical location 214 may be one or more of a virtual reality-dedicated cabin, a phone booth, a meeting room, or any room within or outside of a building where a guest 212 can connect to the live event physical location virtual replica 206 of the persistent virtual world system 114 through the network 210. In these embodiments, guest movements and interactions with objects 220 or people in the live event physical location 202 during the remote visit are performed by physically moving within the guest physical location 214 or by manipulating a controller interface on the user device 216 (e.g., controller pad, buttons, joystick, air movements on an air interface, etc.).

According to an embodiment, the host 218 is a personal assistant dedicated to assist the guest 212 during the visit to the live event. The personal assistant may be an artificial intelligence agent represented by an avatar viewable in the event physical location 202, or a real human being present at the event physical location 202. In other embodiments, the host 218 may join the event physical location 202 remotely as a virtual avatar in order to receive the one or more guests 212, therefore not needing to be physically at the event physical location 202. The personal assistant may be the originator of the live event, may be an assistant to the originator, or may be a completely artificial intelligence agent configured to assist the guest 212.

For example, during a university lecture, a professor may access a classroom virtually as a virtual replica, or virtual avatar. In this example, the professor may view the virtual replica of the classroom along with the virtual avatars of the students, and the students may as well view the virtual avatar of the professor teaching live and interact in real-time with the professor. Further in this example, the students may comprise both real students physically present in the classroom, and virtual students accessing the classroom remotely through the classroom virtual replica in the persistent virtual world system 100, enabling them to view and interact with the virtual avatars of the other real or virtual students, of the professor, and of the classroom hosting the lecture. In another example, a group of tourists visiting a museum book a tour guide to lead them through the museum. The group of tourists may be comprised of tourists being present physically in the museum, tourists accessing the museum remotely through their virtual avatars by accessing the museum virtual replica through persistent virtual world system 100, or combinations thereof. The tour guide may also be physically present at the museum or may join the museum virtually through his or her virtual avatar by accessing the museum virtual replica. In the examples above, the system 200 provides a greater level of flexibility to guests 202 and hosts 218 in terms of their resource availability, as those who are located too far from the live event physical location 202 or which do not have enough time to visit the live event physical location 202 may do so remotely. Additionally, implementations of system 200 may also prevent or diminish physical clustering of spaces, because at least some of the guests 212 and/or hosts 218 may be virtual avatars.

In some embodiments, the live event physical location virtual replica 206 is accessed by the guest 212 through the persistent virtual world system 114 in augmented or virtual reality. In these embodiments, the at least one cloud server 100 stores separate layers for each of the augmented and virtual reality that are activated through the user device 216 connected to the at least one cloud server 100, each layer comprising augmentations of reality and virtual replicas specific to each layer. For example, the people within the live event may have specific objects activated in the augmented reality layer that may only be viewed in augmented reality. When the guest 212 visits the live event, he may only view each of the participants and objects of the live event, with no further augmentation, but when the guest 212 activates the augmented reality layer, objects and interactions with the augmentations in the augmented reality layer may be available to the guest 212.

According to an embodiment, user devices 216 have a personal identifier or respective user data that enables the at least one cloud server 100 to identify participants in order to provide a personalized experience. Further in this embodiment, each transaction performed by the guest 212 is recorded in the memory of the at least one cloud server 100 under the user device personal identifier. In yet further embodiments, each interaction, comprising transactions within the live event, is recorded through one or more respective smart contracts on a blockchain or distributed ledger under the user personal identifier. In yet further embodiments, interactions between virtual replicas or any other element of the live event physical location virtual replica 206 are recorded through smart contracts on a blockchain or distributed ledger.

In some embodiments, the personalized experiences can take the form of a personalized store front or visitation room displaying characteristics matching the preferences of the guest 212, such as having the store front or visiting area augmented with the guest's favorite colors, music, and range of products that can improve the virtual visiting experience. In some embodiments, the personalized experience can comprise modifying a theme of the store front or visitation area, which can comprise implementing a virtual modification of the context of the store front or visitation room automatically based on the available recorded interaction and preference data or as selected by the guest or host. For example, the store front or visitation area can be overlaid by jungle, beach, mountain, lake, or desert theme, where the context comprising the colors, objects, music and general ambiance of the store front or visitation area are virtually augmented to match the selected theme.

In some embodiments, the systems of the current disclosure may use a cloud to edge infrastructure that may implement distributed computing capabilities employing public or private cloud servers, fog servers, and other systems such as enterprise systems, mobile platforms, machinery, robots, vehicles, sensors or user devices, all of which may connect through a network 210. In some embodiments, the cloud to edge infrastructure further comprises a distributed ledger-based infrastructure facilitating the transfer and storage of data necessary to widely distribute the persistent virtual world system 114, including virtual replicas, pure virtual objects, applications, and any event or interaction within the persistent virtual world system 114. This way, resources including physical servers and network equipment enable a shared storage and computing that may be dynamically allocated depending on factors such as the distance of the user to the resources and the network and computational demand from the users relative to each other and to the locational positions where they are, commanding more or less compute accordingly. In some embodiments, the dynamic allocation of storage and computing is codified into smart contracts using the distributed ledger infrastructure, automatizing the transactional logic (e.g., the computer logic behind each allocation of storage and computing) and the consequences or results of allocation.

According to an embodiment, tracking of devices is performed by one or more of time of arrival (TOA), angle of arrival (AOA), and visual imaging techniques. The tracking may be performed by one or more of radar technology, antennas, Wi-Fi, inertia measuring units, gyroscopes, and accelerometers.

In some embodiments, in order to reduce hardware and network demands, contribute to the reduction of network latency, and improve the general merged reality experience, the system may connect through a network 210 including millimeter-wave (mmW) or combinations of mmW and sub 6 GHz communication systems, such as through $5^{th}$ generation wireless systems communication (5G). In other embodiments, the system may connect through wireless local area networking (Wi-Fi) providing data at 60 GHz. Provided communication systems may allow for low latency and high Gbps downlink speeds to end points in the field, complying with parameters necessary for executing the typically highly-interactive digital reality applications or other highly-demanding applications. This results in high-quality, low latency, real-time digital application content streaming. In other embodiments, the system may communicatively connect through 4th generation wireless systems communication (4G), may be supported by 4G communication systems, or may include other wired or wireless communication systems.

In other embodiments, global navigation satellite systems (GNSS), which refers generally to any satellite-based navigation systems like GPS, BDS, Glonass, QZSS, Galileo, and IRNSS, may be used for enabling positioning of devices.

Employing signals from a sufficient number of satellites and techniques such as triangulation and trilateration, GNSS can calculate the position, velocity, altitude, and time of devices. In a preferred embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 60 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

Figure 3:
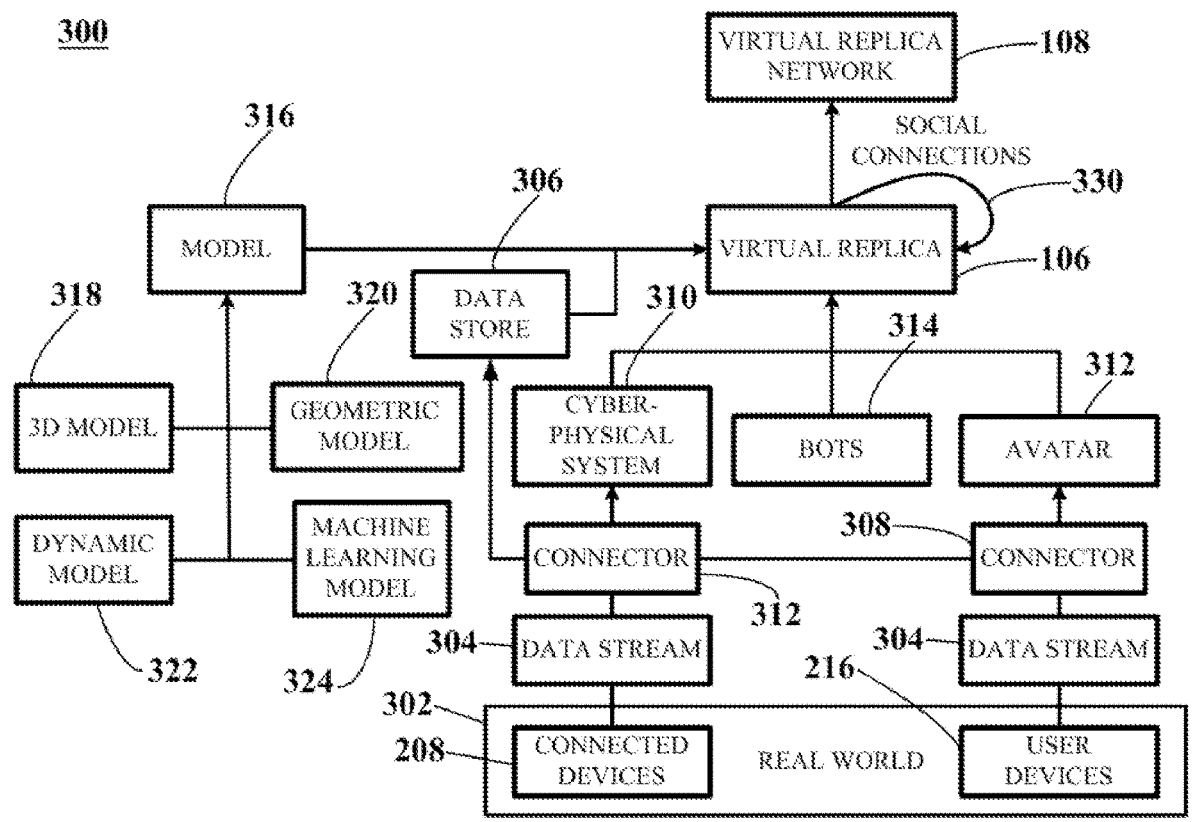
FIG. 3 depicts a diagram illustrating data and models used to generate a virtual replica network used in a virtual presence merged reality system, according to an embodiment.

FIG. 3 depicts a diagram of a system 300 describing the design of a virtual replica and the derived virtual replica network used in a virtual presence merged reality system, according to an embodiment. Some elements of FIG. 3 may refer to similar or the same elements of FIGS. 1-2 and thus may use the same reference numbers.

As viewed in FIG. 3, elements in the real world 302, comprising connected devices 208 and users devices 216, are connected to the persistent virtual world system through data streams 304. These data streams 304 can be uni-directional or bi-directional depending on the capabilities of the connected devices 208. The persistent virtual world system, as explained with reference to FIG. 1, may be stored in cloud servers 102 and shared in a cloud to edge computing and networking infrastructure.

The data streams 304 sent by connected devices 208 may be obtained by sensors installed on the connected devices 208, such as one or more temperature sensors, proximity sensors, inertial sensors (e.g., inertia measuring units, accelerometers, gyroscopes, and magnetometers), infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. The data streams 304 of the user devices 216 may comprise, apart from sensor data, user input data resulting from interactions with applications via the user devices 216.

By providing a plurality of connected devices 208 and user devices 216 with sensing mechanisms constantly capturing data from the real world 302, the virtual world and each of the synchronized virtual replicas 106 are kept updated with real-time, multi-source data that mirror the conditions of the real world 302. The multi-source data includes capturable data of each real-world element, comprising one or more of 3D image data, 3D geometries, 3D entities, 3D sensory data, 3D dynamic objects, video data, audio data, priority data, chemical composition, waste production data, textual data, time data, positional data, orientational data, velocity data, temperature data, humidity data, pollution data, lighting data, volume data, flow data, chromatic data, power consumption data, bandwidth data, and mass data, amongst others.

Interactions in the persistent virtual world system with the virtual replicas 106 are enabled through the exchange of data, using publish/subscribe services connected to data stores 306 of each virtual replica 106. Data types may include periodic and aperiodic, synchronous and asynchronous data. Each virtual replica 106 keeps a data store 306 where the data can be updated by the real twin or by microservices (not shown). Data in the persistent virtual world system can be associated directly to specific virtual replicas 106 or can be processed as anonymous data, which can comprise aggregation of multiple streaming sources of related virtual replicas 106. For example, data from all the units of a specific model of a car could be processed and aggregated to stream data to be available for predictive maintenance services.

Microservices refer to individual services that can be developed, deployed and maintained independently, each service being configured to perform discrete tasks and communicating with other services through APIs. Each microservice can update data in the data store 306 of the virtual replicas 106 using the virtual replica models and relationships with the environment to modify the value of specific attributes of the virtual replicas 106. Microservices can use specific core services of the persistent virtual world system, such as a plurality of engines, or be connected to external platforms, as will be apparent in FIG. 4.

The data streams 304 may be stored in the data stores 306 via connectors 308. The connectors 308 may comprise software and hardware used to read data of the data streams 304 and write to the data stores 306. The connectors 308 may use publish/subscribe application programming interfaces (APIs) to connect to the data stores 306 and help to feed the virtual replicas 106 with the data streams 304 from connected devices 208 and user devices 216. The data streams 304 of the connected devices 208 further feed a cyber-physical system 310 through the connectors 308, whereas the data streams 304 of user devices 304 feed virtual avatars 312 of the users through the connectors 308. System 300 also comprises implementation of bots 314, which may be include hardware and software configured to respond as automated agents with human or human-like behavior by employing machine learning algorithms. The human avatars 312 may be configured to display the physical characteristics of the human users, or may be configured with a different visual aspect and characteristics.

In the current disclosure, a pair of virtual-real twin, or twin-pair, can be considered as a cyber-physical system 310, which is an integration of computation with physical processes whose behavior is defined by both cyber and physical parts of the system. Therefore, a virtual replica 106 is the cyber part of the cyber-physical system 310. The virtual replica 106 may then be considered as an extension of the real twin that allows connecting the physical part with artificial intelligence and simulations to improve the capabilities and performance of the object. The virtual replica 106 may, in some embodiments, be a substitute of a part of the physical components and processes. For example, in cases when a sensor is failing in the real counterpart the sensing inputs for the real twin are provided by the interactions of the virtual twin in the virtual world. In another example, part of the computation for the real twin could be done in the virtual world if the battery is running low in the real twin.

The virtual replicas 106 may also comprise models 316, which refer to any graphical, mathematical or logical representation of aspects of the reality that may be used to replicate the reality in the persistent virtual world system. In some embodiments, suitable models 316 comprise one or more of a 3D model 318, geometric model 320, dynamic model 322, or machine learning model 324, or combinations thereof. Although only four models are herein disclosed, those skilled in the art may appreciate that the system may be adapted to implement fewer or more models than those presented, as required.

The 3D model 318 goes in hand with the geometric model 320 to show data included in each of the geometries of the virtual replica 106, such as textures, colors, shading, reflection, collision effects, and the like. The 3D models 318 comprise the 3D data structure that is used to visually represent the virtual replicas 106 and other virtual elements in the persistent virtual world system, such as applications, ads, virtual bots, etc. In one embodiment, the 3D data structure is an octree data structure, such as sparse voxel octrees or dense voxel octrees. In other embodiments, other suitable data structures can be used, such as quadtrees, BSP trees, 3D arrays, kD trees, point clouds, wire-frames, boundary representations (B-Rep), constructive solid geometry trees (CSG Trees), bintrees, and hexagonal structures. The 3D data structure serves the function of accurately and efficiently representing the data of each of the geometries of the virtual objects in the persistent virtual world system. A correct selection of the 3D data structure depends on the origin of the data, the precision of geometries sought for during rendering; whether the rendering is done in real-time or is pre-rendered; whether the rendering is performed via the cloud servers, via the user devices, fog devices, or combinations thereof; the specific applications for which the persistent virtual world system is employed, for example, a higher level of definition may be required for a virtual visitation requiring checking specific textures and details of a product; memory capacities from the servers and from the user devices and thus, desired memory consumption; and others.

The geometric model 320 comprises the mathematical model defining the shape of the virtual replica 106 based on the real-world element and may be complemented by the 3D model 318.

The dynamic model 322 represents the mathematical model describing the behavior of the real-world objects in the virtual world over time, may comprise a set of states that occur in a defined sequence, and may comprise continuous (e.g., algebraic or differential equations) and discrete (e.g., as state-machine or stochastic models) dynamics models.

The machine learning model 324 is a mathematical representation of the real-world objects and processes, normally generated by a machine learning algorithm based on actual or simulated data that have been used as training data to learn from. This model may enable implementation of artificial intelligence techniques that can be used to optimize the operation and/or performance of the real twin through the virtual twin. The machine learning model may employ machine learning algorithms that allow teaching a virtual replica 106 about the behavior of a real twin in order to simulate the behavior of the real twin.

In some embodiments, the models 316 used by the virtual replicas 106 consider the level of detail (LOD) required by a specific scenario computation. LOD involves decreasing the complexity of a model representation as the virtual replica 106 moves away from the viewer, or according to other metrics such as object importance, viewpoint-relative speed, viewer classification, or position. LOD is a feature typically used in game engines to optimize real-time rendering, using more detailed models only where the point of view of the user is closer to the object. LOD management increases the efficiency of computing processes, such as the rendering process by decreasing the workload on graphics pipeline usage, typically vertex transformations, or by enhancing physical simulations, as different physical models can be associated to the virtual replicas 106, from low to high fidelity models, enabling different simulations to be performed depending on the case and situation LOD management increases the efficiency of computing processes, such as the rendering process by decreasing the workload on graphics pipeline usage, typically vertex transformations, or by enhancing physical simulation, as different 3D models 318 or dynamic models 322 can be associated to the virtual replicas 106, from low to high fidelity models, so that different simulations can be done depending on the case and situation. In general, LOD management may improve framerates and reduce memory and computing demand. LOD management allows also to provide an optimized user experience, depending on the specific requirements and context. In some embodiments, LOD is further adjusted to individual viewers, wherein the adjustments comprise considering the LOD of rendering of a specific scene based on whether the viewer is an artificial intelligence viewer (e.g., an AI host or sales assistant) or a human viewer (e.g., a buyer).

A plurality of connected virtual replicas 106 forms a virtual replica network 108. Each virtual replica 106 in the virtual replica network 108 may display social connections 330 with each other, i.e., interactions amongst each other. These social connections 106 may be managed, in some embodiments, through social media networks.

In some embodiments, a virtual replica 106 includes one or more of 3D world and building data, such as SLAM or derivate-mapping based data; 3D geometry data; 3D point cloud data; or geographic information system data representing real-world structural properties that may serve to model a 3D structure for digital reality applications.

In some embodiments, each of the virtual replicas 106 may be geolocated using a reference coordinate system suitable for use with current geolocation technologies. For example, the virtual replicas may use a World Geodetic System standard such as WGS84, which is the current reference coordinate system used by GPS.

Figure 4:
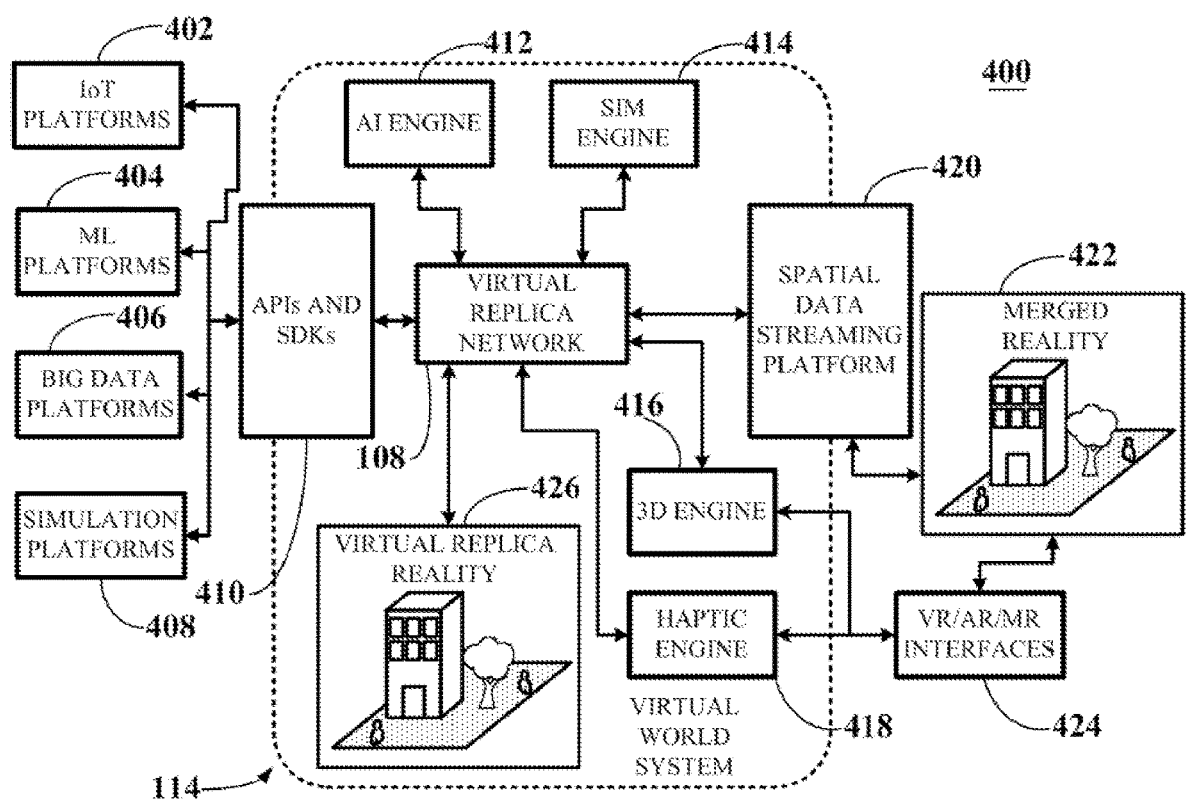
FIG. 4 depicts a diagram illustrating platforms and interfaces used to generate virtual replica networks used in a virtual presence merged reality system, according to an embodiment.

FIG. 4 depicts a diagram of a system 400 describing platforms and interfaces used to generate virtual replica networks used in a virtual presence merged reality system, according to an embodiment. Some elements of FIG. 4 may refer to similar or the same elements of FIGS. 1-3 and thus may use the same reference numbers.

The elements located within the dotted lines represent the persistent virtual world system 114 where virtual replicas and virtual replica networks 108 reside.

As viewed in FIG. 4, the virtual replica networks 108 can connect to a plurality of external platforms or to engine services included in the persistent virtual world system 114. The plurality of external platforms may include, for example, one or more Internet of Things (IoT) platforms 402, machine learning (ML) platforms 404, big data platforms 406, and simulation platforms 408, which may connect to the persistent virtual world system 114 through application programming interfaces (APIs) and software development kits (SDKs) 410, in order to provide and manipulate models and consume or publish data to the virtual replicas.

The IoT platforms 402 refer to software and/or hardware that enable the management of multi-source input data received from sensors in connected devices and user devices. The ML platforms 404 refer to software and/or hardware that provide the virtual replicas with the capability to use machine learning models and algorithms for artificial intelligence applications. The big data platforms 406 refer to software and/or hardware that enable organization in developing, deploying, operating and managing big data related to the virtual replica network 108. The simulation platforms 408 refer to software and/or hardware that enable using the virtual replicas and their data and models in order to virtually recreate the real behavior of the real-world entities.

The engine services included in the persistent virtual world system 114 may include an artificial intelligence engine 412, a simulation engine 414, a 3D engine 416, and a haptic engine 418, amongst others. The artificial intelligence engine 412 may include software and/or hardware that enables the management and application of machine learning models and algorithms for artificial intelligence applications. The simulation engine 414 may include software and/or hardware that enable using virtual replicas and their data and models in order to virtually recreate the real behavior of the real-world entities. The 3D engine 416 may include software and/or hardware that may be used in the creation and processing of 3D graphics of the virtual replicas. The haptic engine 418 may include software and/or hardware that enables implementing haptic features to applications and virtual replicas to provide a touch based interaction to the users. The persistent virtual world system also connects to a spatial data streaming platform 420 configured for the optimized exchange and management of real and virtual spatial data in the persistent virtual world system and between the persistent virtual world systems and the merged reality 422.

The 3D engine 416 and haptic engine 418 may connect to the merged reality 422 via suitable digital reality interfaces 424 in user devices, enabling access to the merged reality 422 in any of virtual reality or augmented reality. The merged reality 422 provides users with an extended reality where real elements are overlapped or augmented by persistent virtual objects, anchored in specific geo-locations or to real elements in the reality, and comprising AI and simulations connected to the virtual replicas of the reality. Users can interact without limitations with this merged reality 422 through their avatar.

In an embodiment, the virtual replica network 108 is an integral part of the persistent virtual world system 114 and enables an implementation of a virtual replica reality 426, where all or most real-world elements are completely virtual and may be virtually enhanced (e.g., adding features to the virtual replicas that the real-world elements may not have). In the current disclosure, the virtual replica reality 426 differs from the typical concept of virtual reality, in that virtual reality may represent an immersive realization of the world where all or most elements are virtual, while the virtual replica reality 426 takes into account the context, accurate geolocation based on the real world objects, and interactions and connections between the virtual replicas, which are kept continuously updated through the data and models input and manipulated via the plurality of platforms and/or engines. Thus, the virtual replica reality 426 may include the actual virtual replica of the world within the persistent virtual world system, wherein the persistent virtual world system provides the data, models, interactions, connections and infrastructure of each virtual replica that, in some embodiments, provide the virtual replica with self-computing capabilities and autonomous behavior.

In yet further embodiments, the system 400 may store in the memory of at least one server separate layers for augmented reality and virtual reality. The separate layers may enable accessing, through the merged reality 422, the virtual replica reality 426 in any of augmented or virtual reality, and may be activated through user devices connected the at least one server whenever accessing one or the other type of reality. Each of the layers may comprise augmentations of reality and virtual replicas that may be specific to each layer. For example, when accessing the merged reality 422 in augmented reality, a user may view the real objects located in the current merged reality scene, the current augmentations of each real object via the corresponding virtual replicas, and the purely virtual objects configured to be visible only in augmented reality. In another example, when viewing the merged reality 422 in virtual reality, the user may only view a version of the virtual replica reality 426 configured for virtual reality, comprising augmentations configured only for the virtual reality view. However, when in virtual reality, users may activate the augmented reality layer in order to view the augmentations and virtual objects originally destined for augmented reality. Likewise, when in augmented reality, users may activate the virtual reality layer in order to be fully transported to virtual reality while still being able to view the augmentations in augmented reality. By way of example, a user may be located in a room during a virtual visitation where, in augmented reality, the people in the room are identified with a label floating on top of their heads, and where there is a miniature version of a virtual floating building visible to the users in the room when viewing in augmented reality. The virtual visitation may have as a goal, for example, evaluation by real estate investors considering the model of the virtual floating building for potential future investment. Further in this example, a user may access the room from a remote location in virtual reality and may only view the room virtually, without being able to view any of the augmentations configured for augmented reality. The user may then activate the augmented reality layer, enabling the user to view the name labels and miniature version of the virtual floating building. The data and models input through the various platforms and/or engines of the persistent virtual world system provide self-computing capabilities and autonomous behavior of virtual replicas, synchronized behavior between the virtual replicas and counterpart real-world objects, enhanced capabilities of the real-world objects through the virtual replicas, and enables employing the data obtained from the real-world objects to perform simulations and machine learning training and inference in order to perform system optimizations (e.g., building energy consumption optimizations).

"Self-computing capabilities", also referred to as "self-managing capabilities" refers herein to the ability to apply artificial intelligence algorithms in order to autonomously manage computing resources (e.g., distributed computing resources). In an embodiment, virtual replicas with self-computing capabilities in the persistent virtual world system are able to autonomously manage computing resources to adapt to changes in the environment of corresponding real-world elements or in the real-world elements themselves. Self-managing rules and conditions may further be governed through the use of smart contracts running on blockchain or distributed ledger technologies, to further codify the rules and conditions in a distributed and transparent way. Thus, in an embodiment, each virtual replica may exhibit autonomous behavior, acting autonomously depending on the conditions in the real world reflected in the persistent virtual world system (e.g., by allocating required resources, autonomously sending and executing commands and/or generating events as required by each circumstance). Achieving this type of behavior may require training the virtual replicas with artificial intelligence algorithms during the modeling and development of the virtual replicas. Thus, the role of a virtual replica developer may be limited to defining general policies and rules that guide the self-management process.

Figure 5:
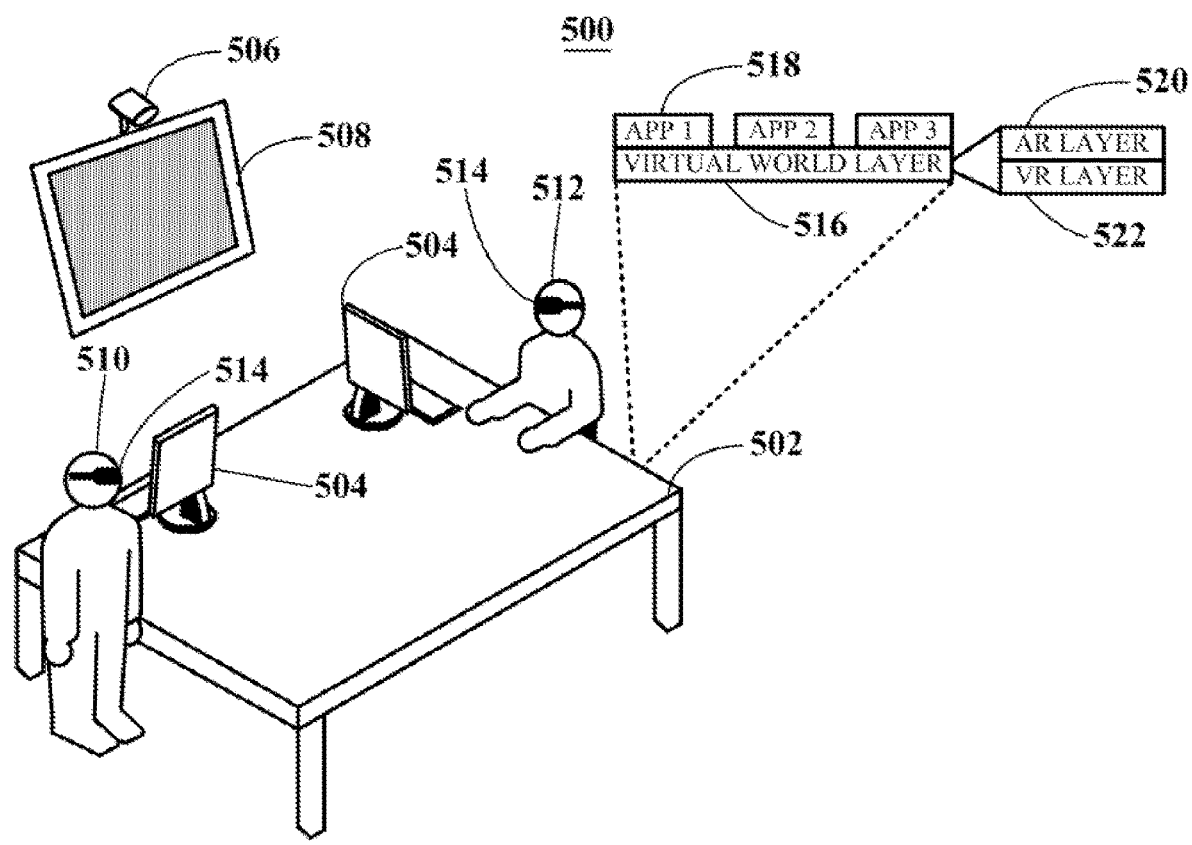
FIG. 5 depicts a sample meeting room enabling virtual presence using the virtual presence merged reality system, according to embodiments of the current disclosure.

FIG. 5 depicts a sample meeting room 500 enabling virtual visitations through a virtual presence, according to embodiments of the current disclosure. The meeting room 500 comprises a table 502, computers 504, a camera 506, a TV 508, and a plurality of participants comprising one or more guests 510 and one or more hosts 512, each of them wearing respective user devices 514, e.g., in the form of digital reality glasses or head-mounted displays.

Each or most of the objects within the meeting room 500 comprises a respective virtual replica included in a persistent virtual world system stored and computed in at least one cloud server, each virtual replica comprising logic, virtual data and models that provide self-computing capabilities and autonomous behavior. In this example, the virtual replicas of the objects in the meeting room 500 are comprised in a virtual world layer 516 mapped on top of the real world, where one or more applications 518 (e.g., applications 1-3) are configured, the applications being available from one or more application libraries stored in the memory of the at least one cloud server, available from external platforms, or available through blockchains or distributed ledger-based distributed databases. The virtual world layer 516 may comprise or be connected to one or more smart contracts recording interactions in a blockchain or a distributed ledger.

The applications 518 can be one or more traditional applications, distributed applications or decentralized applications. Traditional applications are typically based on a traditional client-server model and run on a dedicated server in a static infrastructure. Distributed applications are applications stored mostly on cloud computing platforms, such as cloud servers of the current disclosure, and may run on multiple systems and devices simultaneously on the same network, or may run on blockchain or distributed ledger-based distributed databases. Decentralized applications run mainly on decentralized infrastructures such as in blockchains or distributed ledger-based distributed databases.

The virtual world layer 516 may further comprise separate layers for augmented and virtual reality objects and experiences, depicted respectively in FIG. 5 as an AR layer 520 and VR layer 522. Each of the AR or VR layers 520-522 may be activated through the user devices 514 connected to the at least one cloud server, and may comprise augmentations of reality enabled through virtual replicas, applications, or combinations thereof specific to each layer. Thus, for example, the guest 510 may visit the meeting room in any of augmented or virtual reality, and may view the corresponding augmentations of each reality by activating the respective AR or VR layer 520-522. In another example, the guest 510 can activate the AR layer 520 and thus be able to view augmentations corresponding to the TV 508 through the virtual replica of the TV 508, such as being able to view further details about the TV 508, zoom in and out of the TV 508, digitally switch the TV 508 on or off, or digitally change channels.

In some embodiments, the guest 510 may visit the event in any of augmented or virtual reality, whereby augmentations of reality are enabled through corresponding activations of the respective AR or VR layer 520-522. In an embodiment of virtual reality, the guest 510 remotely visits the virtual replica of the meeting room 500 and may activate the VR layer 522, enabling all of the virtual replicas, applications and interactions associated to the VR layer 522. Thus, the guest 510 may view all or most of the elements in the meeting room 500 as virtual objects with which the guest 510 may interact, comprising the host 512 or any other people in the meeting room 500. The guest 510 may additionally activate both the AR and the VR layers 520-522 in order to view augmentations available also in the AR layer 520 that may not be available in the VR layer 522. For example, augmentations of the AR layer 520 may enable switching the TV 508 on or off or changing the TV channels.

In some embodiments, independent of whether the virtual world layer 516 is activated, when a user wears or uses a user device 514, the virtual replicas comprised in the virtual world layer 516 persistently compute interactions of the users with the virtual replicas. Thus, the virtual replicas may be in a virtual world layer 516 that is currently deactivated to the user, and may thus be invisible to the user, but the virtual replicas may nevertheless compute any interactions with the user. For example, the host 512 is currently supporting himself on the table 502, which, in the persistent virtual world system, the virtual replica of the table 502 may persistently compute the contact between the host 512 and the virtual replica of the table 502, which may comprise computing resulting effects such as occlusion, application of shadows or lighting, and the like.

The camera 506 may be one or more RGBD camera, depth camera, LIDAR camera, or CCTV camera, and may be configured to record events in meeting room 500, scan and generate 3D images of the meeting room 500, detect state changes in one or more objects within the meeting room 500, or combinations thereof. For example, the camera 506 may detect and recognize gestures from the users and translate them to corresponding gestures in the user's avatars within the persistent virtual world system, which can be used during a virtual visitation through a virtual presence. In further embodiments, the camera 506 may further use artificial intelligence-based machine vision to identify objects or people in the meeting room 500 and their positions and orientations. The cameras 506 may provide data complimentary to the data provided by cameras that may be configured within the user devices 510, which may also be configured to scan and generate 3D images of objects or people in the meeting room 500, detect changes in them, and combinations thereof. In other embodiments, other types of sensing mechanisms may be installed in the meeting room 500 in order to provide further information about the meeting room 500 to the persistent virtual world system, such as sensors configured to capture data related to temperature, humidity, motion, speed, acceleration, and the like. For example, in the case of a virtual visit involving checking of products that are sensitive to temperature (e.g., dairy products), thermometers may be installed close to the products to monitor temperature. Furthermore, motion or contact sensors may be installed close to the products to monitor if a product has been taken to checkout.

Figure 6:
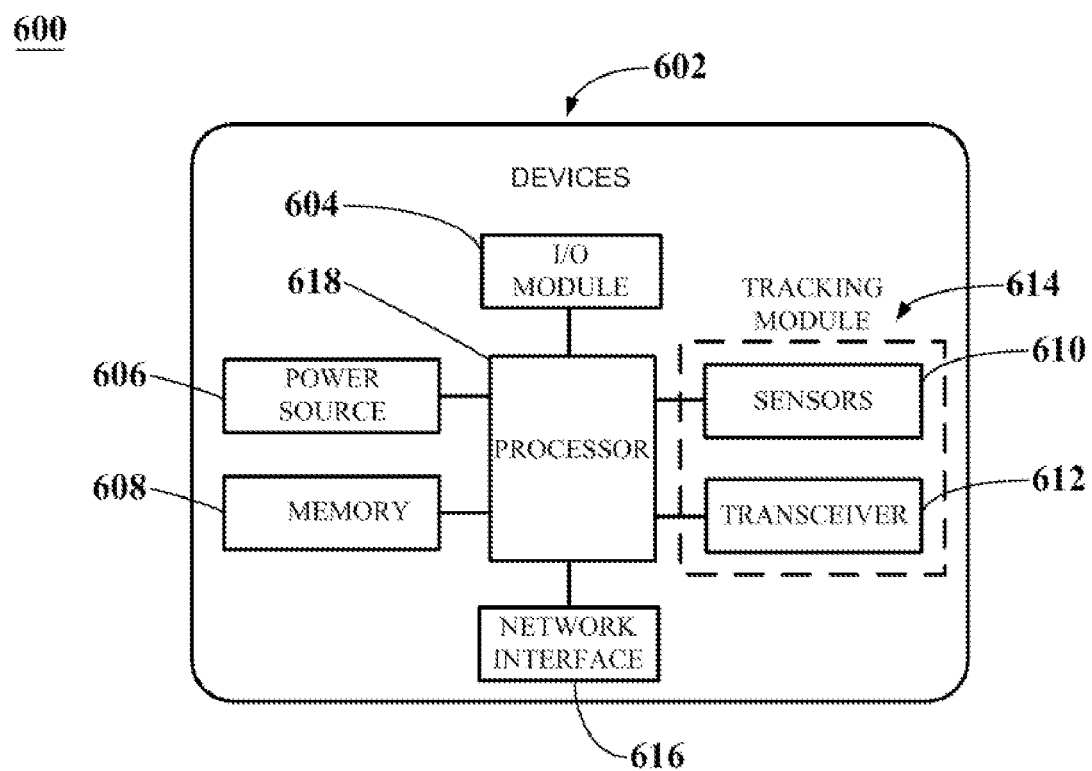
FIG. 6 depicts an operational component diagram of connected devices that may be used in a virtual presence merged reality system, according to an embodiment.

FIG. 6 depicts an operational component diagram 600 of devices that may be used in a merged reality system, according to an embodiment.

A device 602 may include operational components such as an input/output (I/O) module 604; a power source 606; a memory 608; sensing mechanisms 610 and transceivers 612 forming a tracking module 614; and a network interface 616, all operatively connected to a processor 618.

The I/O module 604 is implemented as computing hardware and software configured to interact with users and provide user input data to one or more other system components. For example, I/O module 604 may be configured to interact with users, generate user input data based on the interaction, and provide the user input data to the processor 618 before being transferred to other processing systems via a network, such as to a server. In another example, I/O modules 604 is implemented as an external computing pointing device (e.g., a touch screen, mouse, 3D control, joystick, gamepad, and the like) and/or text entry device (e.g., a keyboard, dictation tool, and the like) configured to interact with other connected elements. In yet other embodiments, I/O module 604 may provide additional, fewer, or different functionality to that described above.

The power source 606 is implemented as computing hardware and software configured to provide power to the device 602. In one embodiment, the power source 606 may be a battery. The power source 606 may be built into the devices or removable from the devices, and may be rechargeable or non-rechargeable. In one embodiment, the devices may be repowered by replacing one power source 606 with another power source 606. In another embodiment, the power source 606 may be recharged by a cable attached to a charging source, such as a universal serial bus ("USB") FireWire, Ethernet, Thunderbolt, or headphone cable, attached to a personal computer. In yet another embodiment, the power source 606 may be recharged by inductive charging, wherein an electromagnetic field is used to transfer energy from an inductive charger to the power source 606 when the two are brought in close proximity, but need not be plugged into one another via a cable. In another embodiment, a docking station may be used to facilitate charging.

The memory 608 may be implemented as computing hardware and software adapted to store application program instructions and to store multi-source data captured by the sensing mechanisms 610. The memory 608 may be of any suitable type capable of storing information accessible by the processor 618, including a computer-readable medium, or other medium that stores data that may be read with the aid of an electronic device, such as a hard-drive, memory card, flash drive, ROM, RAM, DVD or other optical disks, as well as other write-capable and read-only memories. The memory 608 may include temporary storage in addition to persistent storage.

The sensing mechanisms 610 may be implemented as computing hardware and software adapted to obtain multi-source data from the real world and determine/track the position and orientation of the device 602 and, therefore, of the one or more real-world elements to which the device 602 may be linked. The sensing mechanisms 610 may include, without limitations, one or more include one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. In particular, the sensing mechanisms 610 include one or more Inertia Measuring Units (IMUs), accelerometers, and gyroscopes. The IMU is configured to measure and report the velocity, acceleration, angular momentum, speed of translation, speed of rotation, and other telemetry metadata of device 602 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions.

The transceivers 612 may be implemented as computing hardware and software configured to enable devices to receive wireless radio waves from antennas and to send the data back to the antennas. In some embodiments, mmW transceivers 612 may be employed, which may be configured to receive mmW wave signals from antennas and to send the data back to antennas when interacting with immersive content. The transceiver 612 may be a two-way communication transceiver 612.

According to an embodiment, the transceivers 612 enable direct communication between computing devices via a distributed ledger-based communications pipeline connected to a network. The distributed ledger-based communications pipeline may enable direct communication between device 602 through a decentralized network by allowing storage of information in a secure and accurate manner using cryptography, employing cryptographic "keys" and cryptographic signatures. In other embodiments, the distributed ledger may also be utilized between a server and a device 602, where the server may take the authority to validate data before distributing it to each device 602.

In an embodiment, the tracking module 614 may be implemented by combining the capabilities of the IMU, accelerometers, and gyroscopes with the positional tracking provided by the transceivers 612 and the accurate tracking, low-latency and high QOS functionalities provided by mmW-based antennas may enable sub-centimeter or sub-millimeter positional and orientational tracking, which may increase accuracy when tracking the real-time position and orientation of device 602. In alternative embodiments, the sensing mechanisms 610 and transceivers 612 may be coupled together in a single tracking module device.

The network interface 616 may be implemented as computing software and hardware to communicatively connect to a network, receive computer readable program instructions from the network sent by the one or more servers or by other devices, and forward the instructions for storage in the memory 608 for execution by the processor 618.

The processor 618 may be implemented as computing hardware and software configured to receive and process instructions. For example, the processor 618 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 618 may receive user input data from I/O module 604 and may respectively implement application programs stored in the memory 608. In other examples, the processor 618 may receive multi-source data from sensing mechanisms 610 captured from the real world, or may receive an accurate position and orientation of device 602 through the tracking module 614, and may prepare some of the data before sending the data to a server for further processing.

Figure 7:
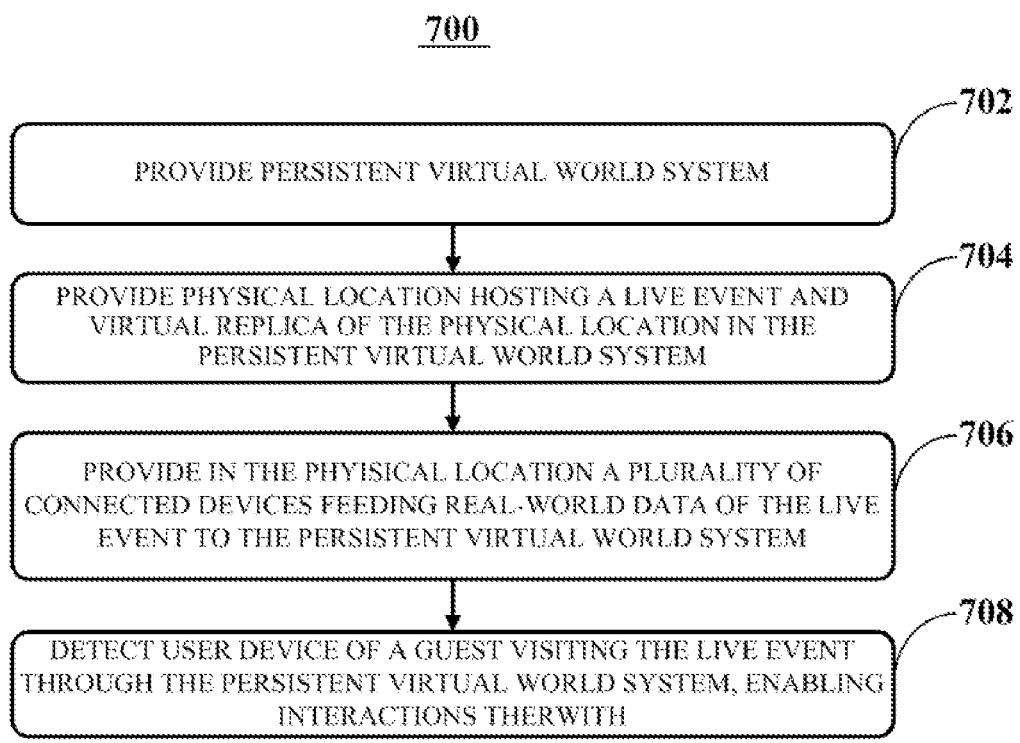
FIG. 7 depicts a method enabling a virtual presence merged reality system.

FIG. 7 depicts a method 700 enabling a virtual presence merged reality system.

Method 700 may begin in step 702 by providing in the memory of a server a data store storing a persistent virtual world system mapped according to the real world and comprising one or more virtual replicas of real world elements, the one or more virtual replicas comprising logic, virtual data and models that provide self-computing capabilities and autonomous behavior. Method 700 may proceed in step 704 by providing a physical location hosting a live event and comprising a context associated with the live event, wherein a virtual replica of the physical location is comprised in the persistent virtual world system of the at least one server. Subsequently, method 700 may proceed in step 706 by providing in the physical location a plurality of connected devices communicating to the persistent virtual world system through a network and including sensing mechanisms configured to capture real-world data of the live event. Finally, method 700 may end in step 708 by detecting a user device of a guest visiting the live through the persistent virtual world system, enabling interactions with one or more elements within the live event.

Example Use Cases

A guest intending to visit or buy an asset located in a remote location and which requires personal attention and service from a host, virtually visits the remote location hosting the visit. The guest may initially need to create an account with the persistent virtual world system, which may be done by accessing the persistent virtual world system through the cloud server, or may require downloading and installing one or more programs in the user device in order to access the persistent virtual world system. The guest accesses the remote location hosting the visit from his home, from a VR-dedicated room, or from any other suitable location, by wearing a virtual reality headset, augmented or mixed reality headset, smart contact lenses, or any immersive reality device. The user may further wear haptic gloves that simulate, through vibrations, the feeling of touch when interacting with virtual objects. The room from where the guest accesses the remote location may additionally comprise one or more cameras that can provide external tracking of the movements of the user, which complement the information of the internal sensors (e.g., IMU, gyroscopes, eye-trackers, cameras, etc.) provided by the user device. The room may further comprise other types of sensors. The asset subject to the visit can be, for example, a machine (e.g., industrial machines, robotic arms, vehicles comprising cars, airplanes, ships, etc.), warehouse, conference meeting, real estate property, auction, art piece, or any asset located in a remote location which may require a private or semi-private attention from a host or assistant to show the asset around. The visit can further be a virtual reality call, where a user does not only listen to the person on the other side but may view and interact with the person on the other side of the line. The guest user device may comprise a user personal identifier that can enable hosts to know in advance which user is visiting their location in order to provide a personalized service and experience, and may enable recording each transaction or interaction under the personal identifier. Recording of transactions and interactions may be performed in the memory of the cloud server or through a smart contract on a distributed ledger or blockchain connected to the persistent virtual world system.

In some embodiments, the at least one cloud server stores separate layers for each of the augmented and virtual reality that are activated through the user device, each layer comprising augmentations of reality and virtual replicas specific to each layer.

Upon connecting to the persistent virtual world system, the user may select the location where the visit will take place, wherein each location has an associated digital identifier code comprising one or more of a QR code, URL, IP address, MAC address, cryptographic hash, universally unique identifier, and organizationally unique identifier. In certain situations, such as when a human host attends the guest, an appointment may be required in order to meet at the time agreed upon. In other cases, the guest may require an invitation from the host in order for the user to be able to access the location hosting the visit. For example, in the user interface of the persistent virtual world system, the location of the desired event may be blocked or unavailable unless the invitation is received, disabling the digital identifier of the location. In other examples, the guest may select the location of the event and access the event without any previous invitation or permission from the host. In other embodiments, the user may virtually select and access the physical location and make the virtual visit without any previous invitation or permission. The physical location hosting the visit may comprise a plurality of cameras, such as a plurality of RGBD cameras, depth cameras, LIDAR cameras, CCTV cameras, and Internet of Things devices, which can record events within the physical location, detect and recognize objects, and scan and create 3D images of the object that are used to generate virtual data for the virtual replica of the physical location in order to update the event in real time. Each or most objects within the physical location hosting the visit thus comprises a corresponding virtual replica comprising logic, virtual data and models that provide each virtual replica with self-computing capabilities and autonomous behavior associated with the corresponding real object, which can furthermore augment the real objects. In a further embodiment, the virtual replica of the remote location may further comprise an associated application library enabling ads, games, or any type of application that a guest can interact with in order to further augment his visiting experience. The applications can be available in the form of standard computer applications, distributed applications available through the cloud servers in application libraries in the persistent virtual world system or through blockchains or distributed ledger-based distributed databases, or decentralized applications. The distributed applications or decentralized applications may interface users through smart contracts through blockchains or distributed ledgers.

For example, in the case of a visit for purchasing a yacht, the visitor, upon receiving an invitation, may select the yacht through his or her virtual reality headset, augmented or mixed reality headset, smart contact lenses, or any immersive reality device which takes the user in virtual reality through the persistent virtual world system to the yacht by accessing the location associated to the yacht digital identifier. Upon selecting the yacht, a host device of the yacht may detect the user personal identifier and may alert the host that the identifier guest is visiting. The host may then show the guest around the yacht, which may involve moving around in the yacht in order to view each of the yacht sections. The objects in the yacht may be further augmented through the data of the virtual replicas, showing further data, views (e.g., zooming in and out from the yacht, panning or rotating views, checking textures and details, etc.), enabling changing colors or other features of each object for augmenting the experience to the guest. The host and guest may communicate and negotiate by voice, text, facial expressions, hand movements, and combinations thereof as well as other types of interactions. If the guest decides to make a transaction, such as purchasing the yacht, the transaction may either be automatically performed at the moment of ending the session or at a later point through an automatic payment system accessing the user's payment card data associated to the personal identifier linked to the user account with the persistent virtual world system. In another embodiment, the transaction may be enabled through the use of a smart contract recording on a blockchain or distributed ledger the binding purchase agreement and initiating the transaction of the related real or digital currencies to be transferred. In another embodiment, the transaction may be enabled by the user virtually crossing a predetermined checkout area in the yacht. The checkout area may, through the tracking of the user device, accurately detect the geolocation and spatial location of the user avatar in order to detect when the checkout has been crossed. Crossing the predetermined checkout area may trigger the cloud server to retrieve the guest's payment information associated to the guest's personal identifier linked to user account in the persistent virtual world system, automatically paying for the purchased goods and triggering a delivery system to deliver the goods to the user.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

The invention claimed is:

1. A virtual presence merged reality system comprising:
at least one server comprising at least one processor and memory storing a persistent virtual world system comprising one or more virtual replicas of real world elements;
wherein the persistent virtual world system comprises a virtual replica of a physical location hosting a live event, wherein the persistent virtual world system is configured to communicate through a network with a plurality of connected devices that include sensing mechanisms configured to capture real-world data of the live event, and wherein the persistent virtual world system is configured to enable one or more guests to be represented as an avatar within the virtual replica of the physical location hosting the live event and thereby virtually visit the live event through the persistent virtual world system via a user device and interact with elements from the live event and to enable interactions between elements in the live event.

2. The system of claim 1, the virtual replicas comprising virtual data and models, wherein the models comprise one or more of a 3D model, a dynamic model, a geometric model, or a machine learning model, or one or more combinations thereof, and wherein the models consider a level of detail required by a specific scenario computation, wherein the level of detail adjusts complexity of a model representation depending on distance of the virtual replica from a viewer, object importance, viewpoint-relative speed or position, or classification of individual viewers, or one or more combinations thereof.

3. The system of claim 1, wherein the plurality of connected devices in the physical location include one or more RGBD cameras, depth cameras, LIDAR cameras, CCTV cameras, or Internet of Things devices, or one or more combinations thereof, and wherein the connected devices are configured to record events in the physical location, scan and generate 3D images of the physical location, detect state changes in one or more objects or users within the physical location, or one or more combinations thereof.

4. The system of claim 1, wherein the virtual replica of the physical location hosting the live event is accessed through the persistent virtual world system in augmented or virtual reality, and wherein the at least one server stores separate layers for each of the augmented and virtual reality that are activated through user devices connected to the at least one server.

5. The system of claim 1, wherein the one or more guests access the event through the persistent virtual world system upon receiving an invitation from a host device to access the live event.

6. The system of claim 1, wherein the physical location has an associated digital identifier stored in the at least one server, the digital identifier being retrieved by the user device from the at least one server in order to access the physical location through the persistent virtual world system.

7. The system of claim 6, wherein the digital identifier is retrieved by the user device upon receiving the invitation sent by a host device to access the live event.

8. The system of claim 1, wherein a guest physical location from which a guest remotely accesses the physical location hosting the event comprises connected devices capturing data within the guest physical location, and wherein guest movements and interactions during the remote visit are enabled by physically moving or by manipulating a controller interface on the user device.

9. The system of claim 1, further comprising a personal assistant, wherein the personal assistant is an artificial intelligence agent represented by an avatar viewable in the real location.

10. The system of claim 1, wherein the user device has a personal identifier that enables the at least one server to identify a guest, wherein each interaction performed by the guest, comprising one or more of a transaction or engagement action, is recorded in the memory of the at least one server or in a smart contract of a distributed ledger under the user device personal identifier.

11. A method enabling virtual presence through a merged reality system, the method comprising:
providing at least one server comprising at least one processor and memory storing a persistent virtual world system comprising one or more virtual replicas of real world elements;
providing a virtual replica of a physical location hosting a live event and a context associated with the live event;
providing in the physical location a plurality of connected devices communicating to the persistent virtual world system through a network and including sensing mechanisms configured to capture real-world data of the live event; and
detecting a user device of a guest virtually visiting the live event through the persistent virtual world system in which the guest is represented as an avatar within the virtual replica of the physical location hosting the live event; and
enabling interactions with one or more elements within the live event and between elements of the live event.

12. The method of claim 11, wherein the at least one server stores separate layers for each of augmented and virtual reality that are activated through user devices connected to the at least one server.

13. The method of claim 11, further comprising providing, by a host device, an invitation to the one or more guests to access the live event.

14. The method of claim 11, further comprising providing in the at least one server a digital identifier associated to the physical location hosting the live event, such that the digital identifier can be retrieved by the user device from the at least one server in order to access the physical location through the persistent virtual world system.

15. The method of claim 14, further comprising sending, by the at least one host device, the digital identifier upon the user device receiving the invitation to access the live event.

16. The method of claim 11, further comprising providing a personal assistant, wherein the personal assistant is an artificial intelligence agent represented by an avatar.

17. The method of claim 11, further comprising:
- storing in the at least one server a user device personal identifier enabling identification of the guest; and
- recording each transaction performed by the guest under the user device personal identifier.

18. One or more non-transitory computer readable-media having stored thereon instructions configured to cause a computer system comprising memory and at least one processor to perform steps comprising:
- providing at least one server comprising at least one processor and memory storing a persistent virtual world system comprising one or more virtual replicas of real world elements;
- providing a virtual replica of a physical location hosting a live event and a context associated with the live event;
- providing in the physical location a plurality of connected devices communicating to the persistent virtual world system through a network and including sensing mechanisms configured to capture real-world data of the live event; and
- detecting a user device of a guest virtually visiting the live event through the persistent virtual world system in which the guest is represented as an avatar within the virtual replica of the physical location hosting the live event; and
- enabling interactions with one or more elements within the live event and between elements of the live event.

19. The computer-readable medium of claim 18, wherein the at least one server stores separate layers for each of augmented and virtual reality that are activated through user devices connected to the at least one server.

20. The computer-readable medium of claim 18, wherein the steps further comprise providing in the at least one server a digital identifier associated to the physical location hosting the live event, such that the digital identifier can be retrieved by the user device from the at least one server in order to access the physical location through the persistent virtual world system.

* * * * *